(12) United States Patent
Sakurai et al.

(10) Patent No.: US 11,392,305 B2
(45) Date of Patent: Jul. 19, 2022

(54) VEHICLE INFORMATION COMMUNICATION SYSTEM

(71) Applicant: DENSO CORPORATION, Kariya (JP)

(72) Inventors: Nao Sakurai, Kariya (JP); Kazuaki Hayakawa, Kariya (JP); Takuya Hasegawa, Kariya (JP); Yuzo Harata, Kariya (JP); Kazuhiro Uehara, Kariya (JP); Takuya Kawasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 20 days.

(21) Appl. No.: 16/847,703

(22) Filed: Apr. 14, 2020

(65) Prior Publication Data

US 2020/0241771 A1     Jul. 30, 2020

Related U.S. Application Data

(62) Division of application No. 16/535,149, filed on Aug. 8, 2019, now Pat. No. 10,678,454.

(30) Foreign Application Priority Data

Aug. 10, 2018   (JP) .............................. JP2018-151414
Jul. 12, 2019   (JP) .............................. JP2019-129947

(51) Int. Cl.
    *G06F 3/06*           (2006.01)
    *B60R 16/023*      (2006.01)
    (Continued)

(52) U.S. Cl.
    CPC .......... *G06F 3/0629* (2013.01); *B60R 16/023* (2013.01); *G06F 3/0607* (2013.01);
    (Continued)

(58) Field of Classification Search
    CPC ........ G06F 3/064; G06F 3/0688; G06F 8/654; G06F 9/445; G06F 9/44505; H03M 7/30; H04L 67/12; H04L 67/34; H04L 69/04
    See application file for complete search history.

(56) References Cited

U.S. PATENT DOCUMENTS

2007/0100513 A1    5/2007   Asano
2018/0018160 A1    1/2018   Teraoka et al.
2019/0179629 A1    6/2019   Roy et al.

FOREIGN PATENT DOCUMENTS

JP           2001218242 A      8/2001
JP           2003167746 A      6/2003
(Continued)

OTHER PUBLICATIONS

U.S. Appl. No. 16/535,149, filed Aug. 8, 2019, Nao Sakurai.
(Continued)

*Primary Examiner* — Yong J Choe
(74) *Attorney, Agent, or Firm* — Harness, Dickey & Pierce, P.L.C.

(57) ABSTRACT

A vehicle information communication system includes a vehicle device and a center device. The center device includes a storage unit, a center computer, and a center-device communication unit. The storage unit stores memory structure information for each of the ECUs. The memory structure information indicates whether a corresponding memory has a memory structure that supports Read While Write (RWW) operation defined as having a plurality of physically independent memory regions. The center computer is programmed to generate specification data including the memory structure information for each of the at least one target ECUs. The vehicle device includes a vehicle computer. The vehicle computer is programmed to perform the program data rewrites of the at least one target ECU accord- (Continued)

ing to the memory structure information included in the specification data.

6 Claims, 20 Drawing Sheets

(51) Int. Cl.
  *G06F 8/65* (2018.01)
  *G11C 7/10* (2006.01)
(52) U.S. Cl.
  CPC .............. *G06F 3/0679* (2013.01); *G06F 8/65* (2013.01); *G11C 7/1096* (2013.01); *G11C 2207/2209* (2013.01)

(56) References Cited

FOREIGN PATENT DOCUMENTS

| | | |
|---|---|---|
| JP | 2008-079171 A | 4/2008 |
| JP | 2016115301 A | 6/2016 |
| JP | 2017-097620 A | 6/2017 |
| JP | 2017204098 A | 11/2017 |
| JP | 2018065410 A | 4/2018 |
| JP | 2018090176 A | 6/2018 |
| JP | 20193432 A | 1/2019 |

OTHER PUBLICATIONS

EEtimes, "Renesas Guns for Extreme Safety, No-Wait OTA," EE|Times [online], <URL: https://www.eetimes.com/renesas-guns-for-extreme-safety-no-wait-ota>, May 25, 2018.

ITU-T X.1373 (03/17) "Secure software update capability for intelligent transportation system communication devices," URL:https://www.itu.int/rec/dologin_pub.asp?lang=e&id=T-REC-X.1373-201703-I!!PDF-E&type=items>, Mar. 2017.

Katsuhiko Uetake, Tech+ [online], <URL:https://news.mynavi.jp/itsearch/article/solution/2330>, Jan. 19, 2017.

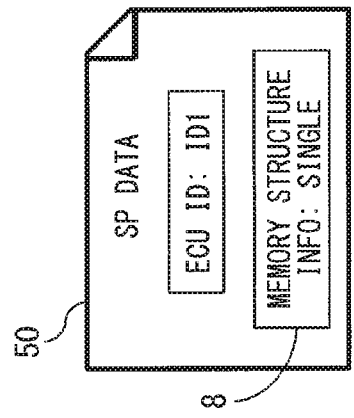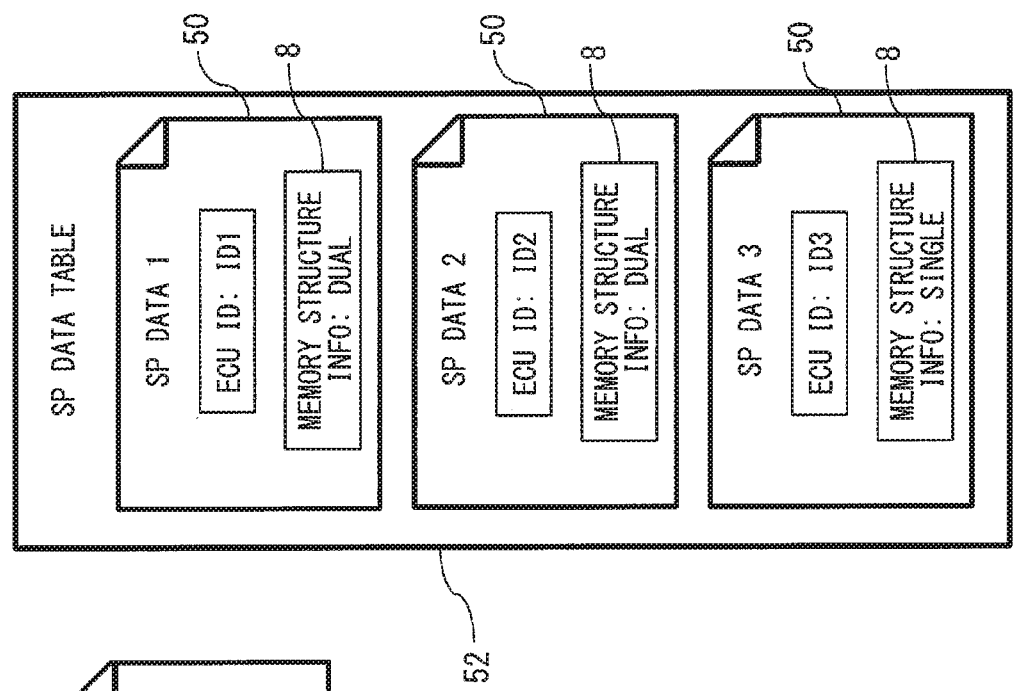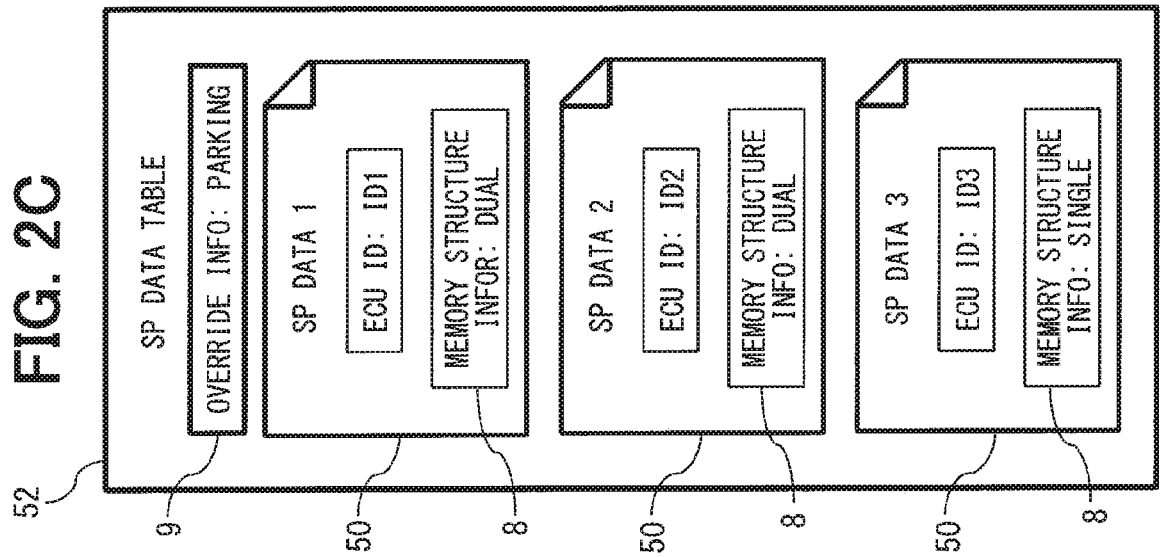

US 11,392,305 B2

VEHICLE INFORMATION COMMUNICATION SYSTEM

CROSS REFERENCE TO RELATED APPLICATIONS

This application is a divisional Application of U.S. patent application Ser. No. 16/535,149 filed on Aug. 8, 2019 which claims the benefit of priority from Japanese Patent Application No. 2018-151414 filed on Aug. 10, 2018 and Japanese Patent Application No. 2019-129947 filed on Jul. 12, 2019. The entire disclosure of all of the above applications are incorporated herein by reference.

TECHNICAL FIELD

The present disclosure relates to a vehicle information communication system.

BACKGROUND ART

In recent years, with the diversification of vehicle control such as driving assist control and autonomous driving control, the scale of application programs such as vehicle control and diagnosis installed in electronic control units (ECUs) of the vehicle is increasing. In addition, with the version upgrade to improve functions, the opportunity to rewrite (reprogram) application programs of the ECUs is also increasing. On the other hand, with the development of communication network technologies, technologies related to connected cars are also developing. Under such circumstances, update programs for ECUs have been transmitted through OTA (Over The Air) to rewrite programs of the ECUs in vehicles.

SUMMARY

In one aspect of the present disclosure, a vehicle information communication system includes a vehicle device and a center device. The vehicle device, mounted in a vehicle, controls programs data rewrites for a plurality of electronic control units (ECU) of the vehicle. Each of the ECUs includes a memory configured to store program data. The center device generates specification data for use by the vehicle device when controlling the program data rewrites. The center device includes a storage unit, a center computer, and a center-device communication unit.

The storage unit stores memory structure information for each of the ECUs. The memory structure information indicates whether a corresponding memory has a memory structure that supports Read While Write (RWW) operation defined as having a plurality of physically independent memory regions. The center computer is programmed to: (i) read from the storage unit the memory structure information of at least one target ECU among the plurality of ECUs, the at least one target ECU being targets for a program data rewrite, and (ii) generate specification data including the memory structure information for each of the at least one target ECUs. The center-device communication unit is configured to wirelessly communicate the specification data generated by the center computer to the vehicle device.

The vehicle device includes a vehicle-device communication unit and a vehicle computer. The vehicle-device communication unit is configured to receive the specification data from the center-device communication unit. The vehicle computer is programmed to perform the program data rewrites of the at least one target ECU according to the memory structure information included in the specification data.

BRIEF DESCRIPTION OF DRAWINGS

The above and other objects, features and advantages of the present disclosure will become more apparent from the following detailed description made with reference to the accompanying drawings.

FIG. 2A is a diagram showing specification data.

FIG. 2B is a diagram showing a specification data table.

FIG. 2C is diagram showing a specification data table including override information.

DESCRIPTION OF EMBODIMENTS

Hereinafter, an embodiment of the present disclosure will be described. In the following embodiment, the vehicle information communication system acts as a system for providing and rewriting programs (software) of ECUs through an over-the-air (OTA). The programs may be application programs such as control programs and diagnosis programs, firmware programs, control data, or any other data used by the ECUs.

Figure 1:
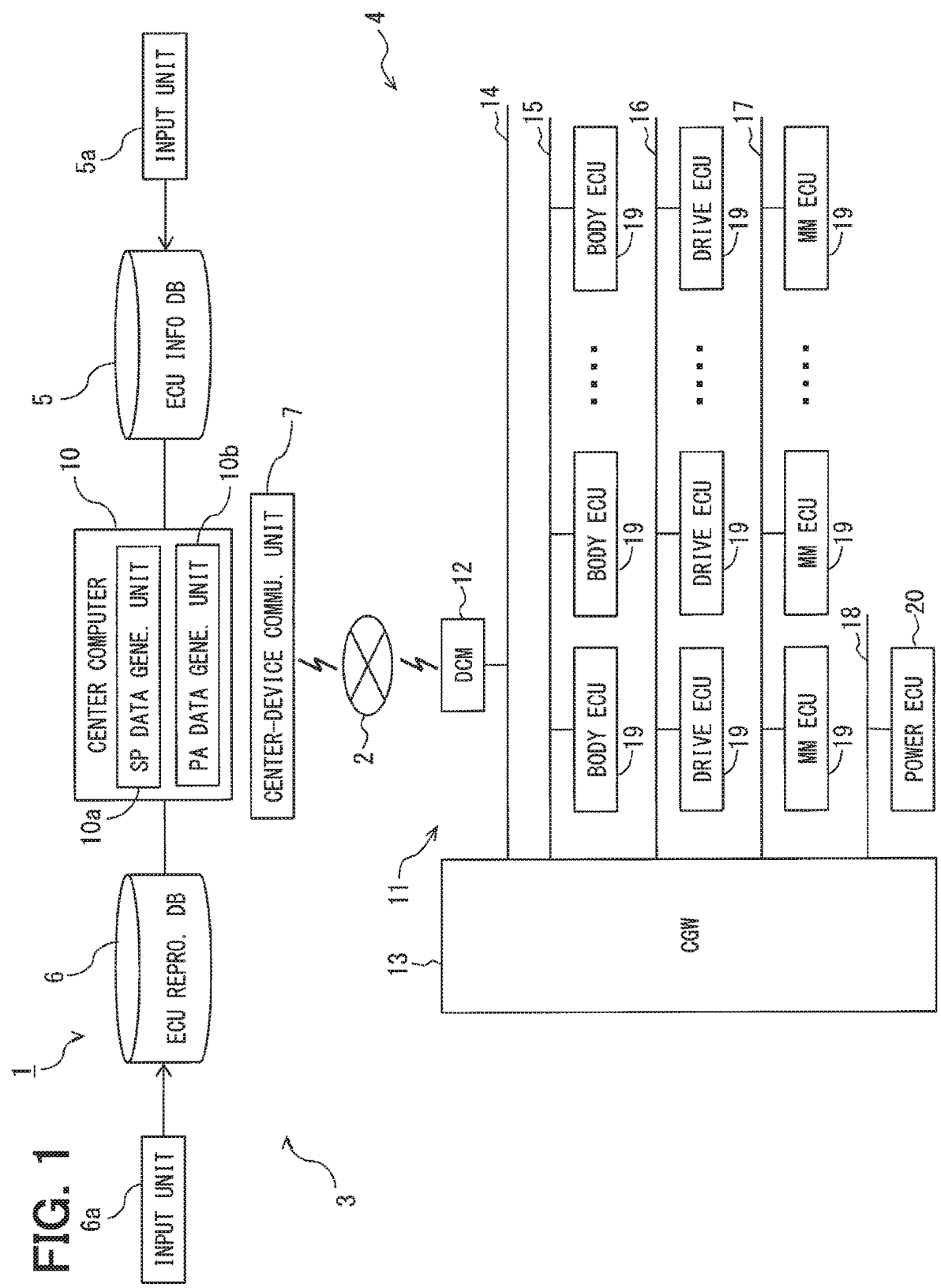
FIG. 1 is a diagram showing an overall configuration of a vehicle information communication system in an embodiment.

FIG. 1 shows a vehicle information communication system 1 according to the present embodiment. The vehicle information communication system 1 is a system configured to rewrite application programs for a plurality of electronic control units (ECUs) 19 mounted in vehicles through OTA. Such application programs include vehicle control programs or diagnostic programs for a vehicle. As shown in FIG. 1, the vehicle information communication system 1 includes a center device 3 and a vehicle device 4 mounted in a vehicle that is linked to the center device 3 through a communication network 2. The communication network 2 includes, for example, a mobile communication network 2 using 4G or 5G networks, the Internet, WiFi™ (Wireless Fidelity), and the like.

The center device 3 entirely controls functions of the OTA via the communication network 2 in the vehicle information communication system 1, and therefore serves as an OTA center. The center device 3 includes a center computer 10, an ECU information DB (storage unit) 5, an ECU reprogramming data DB 6, and a center-device communication unit 7.

The ECU reprogramming data DB 6 has a managing function of application programs transmitted from the center device 3 to the vehicle device 4. The reprogramming data DB 6 is a server that manages program data for updating ECUs 19, information associated with the program data and the like that are provided by suppliers or the like who are providers of application programs. The program data provided by the suppliers may include difference data corresponding to the difference between an old version application program and a new version application program, and the entire data of a new version application program. In the present embodiment, the suppliers provide difference data (hereinafter referred to as "rewrite difference data") is provided.

The ECU reprogramming data DB 6 further stores rollback data provided from suppliers in preparation for cases where program data rewrites are canceled while rewriting (i.e., during installation) new application programs to the ECUs 19. The rollback data is data for rolling back the program data of the ECUs to an old (previous) version. In the present embodiment, difference data between the new version to the old version of program data is stored as rollback data in the ECU reprogramming data DB 6 (hereinafter, referred to as "rollback difference data"). Note that the providers of application programs such as suppliers may register (or input) application programs in the ECU reprogramming data DB via an input unit 6a wirelessly connected to the ECU reprogramming data DB 6. The rewrite difference data and rollback difference data stored in the ECU reprogramming data DB 6 may be compressed by a known data compression technology.

The ECU information DB 5 is mainly provided from an OEM (Original Equipment Manufacturer), and stores memory structure information 8 that specifies the memory configuration of each of the plurality of ECUs 19. More specifically, the ECU information DB 5 stores memory structure information 8 of a flash memory (memory) 28d included in each of the plurality of ECUs 19 mounted on vehicles. That is, the ECU information DB 5 stores the memory structure information 8 for all the ECUs 19 in association with each type of vehicles. The memory structure information 8 indicates whether the memory structure of the ECU 19 is a single type having only one memory region (a program write region) onto which program data is written or a multiple memory type having two or more memory regions. More specifically, the memory structure information 8 indicates whether a corresponding memory 28d has a memory structure that supports Read While Write (RWW) operation defined as having a plurality of physically independent memory regions, as described detail below. Thus, when the ECU 19 has a memory structure of a single type, the memory structure information for the ECU 19 should indicate the memory 28d does not support RWW operation. On the contrary, when the ECU 19 has a memory structure of a multiple memory type, the memory structure information for the ECU 19 should indicate the memory supports RWW operation. Further, in the present embodiment, the memory structure information 8 also includes information indicating that a memory structure of a corresponding ECU 19 is a suspended memory type having two or more "virtually divided memory regions." A detailed description as to memory configuration of each ECU 19 will be described later.

The ECU information DB 5 further stores override information 9 that allows OEMs to control or set the timing of rewriting application programs of ECUs 19. Specifically, OEMs can register (or input) override information 9 in the ECU information DB 5 so that rewrite timing of ECUs 19 can be flexibly set by OEMs at the center device 3. It should be noted the override information 9 can be set in association with a specific type of target vehicles. The override information 9 in the present embodiment includes information indicating whether to restrict the rewriting of application programs for all ECUs 19 mounted in a specific target vehicle to when the vehicle is parked. That is, the override information 9 forcibly controls the timing to rewrite program data for all ECUs 19 mounted in specific target vehicles. Therefore, when the override information 9 is set, the rewriting of the application program for the ECU 19 is restricted to when the vehicle is parked even if some of the ECUs 19 mounted in the specific target vehicle have memory structures that support RWW operation (i.e., the ECUs 19 have multiple type memories 28d and the application programs for the ECUs 19 can be technically rewritten while the vehicle is in operation). OEMs register (or input) the memory structure information 8 and the override information 9 in the ECU information DB via an input unit 5a that is wired or wirelessly connected to the ECU information DB 5.

The center computer 10 according to the present embodiment administers and edits the rewrite difference data and the rollback difference data (hereinafter, both data may be referred to as "updating data") stored in the ECU reprogramming data DB 6. The center computer 10 further administers and edits the memory structure information 8 in the ECU information DB 5. Then, based on the updating data and the memory structure information 8, the center computer 10 generates data to be transmitted to each vehicle. In the following description, the center computer 10 will be described as a single processor that processes various information, as shown in FIG. 1. However, the center computer 10 should not be construed to be limited to a physically single computer, and it may be formed of a plurality of physically separated computers. For example, each of the ECU information DB 5 and the ECU reprogramming data DB 6 may have one or more computers, and the one or more computers may serve, as a whole, the center computer 10 by each performing predetermined functions.

As shown in FIG. 1, the center computer 10 functionally includes a specification data generation unit 10a and a packaged data generation unit 10b. The specification data generation unit 10a reads from the ECU information DB 5 the memory structure information 8 of at least one target ECU 19 among the plurality of ECUs 19 that are targets for a program data rewrite when the center device 3 receives an instruction to transmit updating data. Then, as shown in FIG. 2A, the specification data generation unit 10a generates specification data 50 including the memory structure information 8 read from the ECU information DB 5. The specification data 50 is information defining the processing of program updates (program rewrites) of each ECU 19 controlled by the vehicle device 4. The memory structure information 8 is one element consisting the specification data 50. In the present embodiment, the specification data generation unit 10a (i.e., the center computer 10) generates the specification data 50 when receiving the instruction to transmit updating data, but the timing to generate the specification data 50 is not necessarily limited to this timing. For example, the center computer 10 may generate the specification data 50 upon completion of storing all of new updating data for specific type of vehicles in the ECU reprogramming data DB 6.

When there are a plurality of target ECUs 19, the specification data generation unit 10a reads from the ECU information DB 5 the memory structure information 8 corresponding to each of the plurality of target ECU 19 when the center device 3 receives an instruction to transmit updating data. Then, the specification data generation unit 10a generates the specification data 50 corresponding to each of the plurality of target ECUs 19, and includes the specification data 50 generated into a specification data table 52, as shown in FIG. 2B. At this time, the specification data generation unit 10a arranges in the specification data table 52 the specification data 50 corresponding to each of the plurality of target ECUs 19 in a line in an order in which the target ECUs 19 are rewritten one by one. More specifically, the specification data table 52 is a series of bits in which bits corresponding to each of the specification data 50 are arranged in a rewrite order that indicates an order for performing the program data rewrites of the plurality of target ECUs 19.

Here, the rewrite order in which the specification data 50 is arranged (that is, the order in which the update target ECUs 19 are rewritten) is set based on the memory structure of each of the target ECUs 19. More specifically, the specification data generation unit 10a determines the arranging order of the specification data 50 so that the target ECU 19 having a memory structure of a multiple memory type is rewritten before the target ECU 19 having a memory structure of a single type is rewritten. In other words, if the plurality of target ECUs include at least one first target ECU which supports RWW operation and at least one second target ECU which does not support RWW operation, the specification data generation unit 10a generates the specification data table 52 such that the bits corresponding to the specification data 50 of the at least one first target ECU 19 are arranged in front of the bits corresponding to the specification data 50 of the at least one second target ECU 19. For example, as shown in FIG. 2B, when there are two target ECUs 19 each having a memory structure of a multiple memory type (two memory regions) and one target ECU 19 having a memory structure of a single type (single memory region), the specification data generation unit 10a generates the specification data table 52 such that two of the specification data 50 corresponding to the target ECUs 19 having the multiple type memory is arranged in front of (arranged above in FIG. 2B) the specification data 50 corresponding to the target ECU 19 having the single type memory.

Furthermore, the specification data generation unit 10a includes the override information 9 in the specification data 50 (or the specification data table 52) when the override information 9 is set for the target vehicle to be updated. As shown in FIG. 2C, when the override information 9 restricting the rewriting of program data to when the target vehicle is parked is set for the target vehicle, the specification data generation unit 10a generates the specification data table 52 with the override information 9. In contrast, when the override information 9 is not set for the target vehicle, the specification data generation unit 10a generates the specification data 50 (or the specification data table 52) without the override information 9.

The packaged data generation unit 10b reads the updating data for the target ECUs 19 from the ECU reprogramming data DB 6, associates the updating data with the specification data 50, and transmits the updating data to the target vehicle. Specifically, when receiving an instruction to transmit the updating data, the packaged data generation unit 10b encrypts the rewrite difference data and the rollback difference data corresponding to the target ECUs 19. Then, the packaged data generation unit 10b generates packaged data 54 in which the encrypted updating data and the specification data 50 for the target ECU 19s are packaged into a single file. In the present embodiment, the packaged data generation unit 10b generates the packaged data 54 when receiving an instruction to transmit updating data, but the timing to generate the packaged data 54 is not necessarily limited to this timing. For example, the packaged data generation unit 10b may generate the packaged data 54 after completion of storing all of new updating data for specific type of vehicles in the ECU reprogramming data DB 6 and generation of the specification data 50 by the specification data generation unit 10a. In this case, the packaged data 54 may be stored, for example, in the ECU reprogramming data DB 6, and the packaged data 54 may be read out from the ECU reprogramming data DB 6 upon receiving a transmitting instruction from a user.

Figure 3:
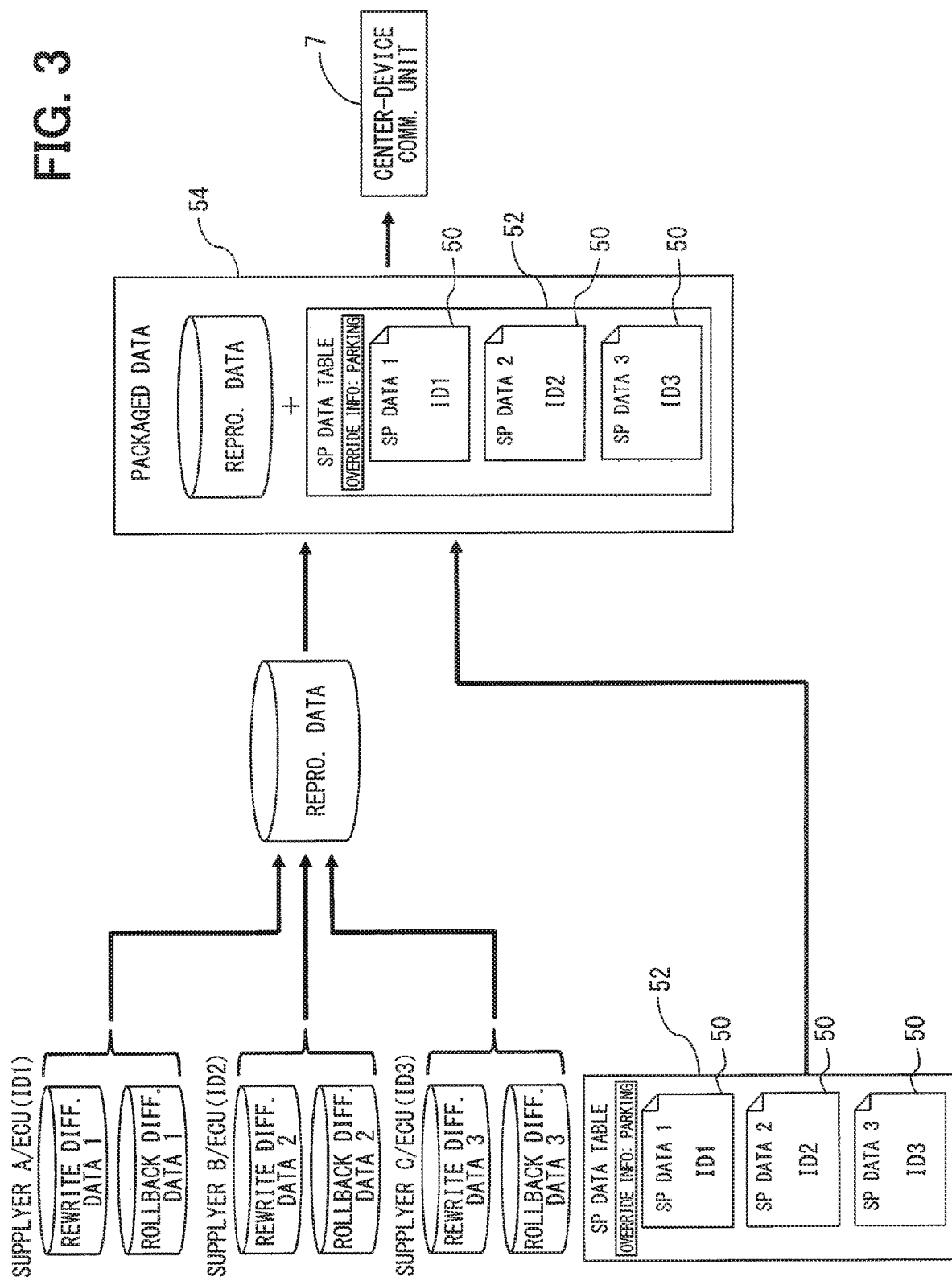
FIG. 3 is a illustrative diagram of packaging reprogramming data and specification data.

FIG. 3 is a diagram showing an image of generating the packaged data 54 by the center computer 10. FIG. 3 shows a situation where at the time of receiving a transmitting instruction from an user, updating data for an ECU (ID 1) from a supplier A, updating data for an ECU (ID2) from a supplier B, and updating data for an ECU (ID3) from a supplier C are supplied to the ECU reprogramming data DB 6 as encrypted rewrite difference data 1 to 3 and rollback difference data 1 to 3. In this example, it is assumed that the ECU (ID1) and the ECU (ID2) have memory structures of a multiple memory type (more specifically, two memory regions), and the ECU (ID3) has a memory structure of a single type (i.e., one memory region). Further, for the target vehicle to be updated, the override information 9 that restricts the rewriting of program data to when the target vehicle is parked is set in advance in the ECU information DB 5 by an OEM.

The center computer 10 generates specification data 50 including the memory structure information 8 corresponding to each of the ECU (ID 1) to the ECU (ID 3), and combines them into one specification data table 52. At this time, the center computer 10 arranges the specification data 50 corresponding to the ECU (ID1) and the ECU (ID2) in the specification data table 52 in front of the specification data 50 corresponding to the ECU (ID3). Also, the center computer 10 includes the override information 9 in the specification data table 52. Furthermore, the center computer 10 combines encrypted rewrite difference data and rollback difference data for each of the ECU (ID1) to the ECU (ID3) into one as reprogramming data. Then, the center computer 10 packages the specification data table 52 including the specification data 50 and the reprogramming data to generate the packaged data 54.

The center-device communication unit 7 is configured to be capable of wirelessly communicating with the vehicle device 4 via the communication network 2. The center computer 10 transmits the packaged data 54 generated as described above to the center-device communication unit 7, and the center-device communication unit 7 wirelessly communicates the packaged data 54 to the vehicle device 4. That is, in the present embodiment, the center-device communication unit 7 transmits the rewrite difference data and the rollback difference data (i.e., the reprogramming data), and the specification data 50 (or the specification data table 52) to the vehicle device 4 as the packaged data 54. However, it is not always necessary to package and transmit the specification data 50 together with the updating data to the target vehicle. For example, the specification data 50 may be transmitted to the target vehicle first, and then the updating data may be transmitted to the vehicle, and vice versa. Furthermore, the specification data 50 and the updating data may be simultaneously transmitted to the target vehicle without being packaged. In the present embodiment, the center-device communication unit 7 is described as a single, independent component as shown in FIG. 1. However, the center-device communication unit 7 may have any form as long as it has a wireless communication function with a vehicle. For example, the center computer 10 may have a communication function, and the center-device communication unit 7 may be integrally formed with the center computer 10.

As shown in FIG. 1, the vehicle device 4 includes a master device 11. The master device 11 has a DCM (vehicle-device communication unit) 12 and a CGW (vehicle computer) 13, and the DCM 12 and the CGW 13 are connected to communicate data to each other through a first bus 14. The DCM 12 is an on-vehicle communication unit that performs data communication with the center device 3 through the communication network 2. More specifically, the DCM 12 is configured to wirelessly communicate with the center-device communication unit 7. When the DCM 12 receives the packaged data 54 from the center-device communication unit 7, the DCM 12 extracts updating data (i.e., the rewrite difference data and the rollback difference data) and the specification data 50 corresponding to each ECU 19 from the packaged data 54 and transmits them to the CGW 13.

The CGW 13 serves as a vehicle central gateway unit having a data relaying function, and upon receiving the updating data from the DCM 12, transmits the updating data to at least one target ECU 19 which is the target for rewriting its application programs. Then, the CGW 13 controls updating (that is, data rewrites and activation) of the application programs of the at least one target ECU 19 based on the specification data 50 (and the specification data table 52). The master device 11 entirely controls functions of the OTA on the vehicle side in the vehicle information communication system 1, and therefore serves as an OTA center.

In addition to the first bus 14, a second bus 15, a third bus 16, a fourth bus 17, and a fifth bus 18 are connected to the CGW 13 as vehicle inside buses, and various types of ECUs 19 are connected to the CGW 13 through the buses 15 to 17. Furthermore, a power managing ECU 20 is connected to the CGW 13 through the fifth bus 18.

The second bus 15 is, for example, a body-system network bus. The ECUs 19 connected to the second bus 15 include, for example, a door ECU 19 for controlling locking/unlocking of doors, a meter ECU 19 for controlling a meter display, an air conditioning ECU 19 for controlling an air conditioner, a window ECU 19 for controlling opening/closing of windows. The third bus 16 is, for example, a driving-system network bus. The ECUs 19 connected to the third bus 16 include, for example, an engine ECU 19 for controlling an engine, a brake ECU 19 for controlling braking operation, a power steering ECU 19 for controlling power steering operation, or the like.

The fourth bus 17 is, for example, a multimedia-system network bus. The ECUs 19 connected to the fourth bus 17 include, for example, a navigation ECU 19 for controlling a navigation system, an ETCECU 19 for controlling an electronic toll collection system (ETC: electronic toll collection system (a registered trademark)). However, the buses 15 to 17 may be another type of system buses other than the body-system network bus, the driving-system network bust, and the multimedia-system network bus. The number of the buses and the electronic control units 19 are not necessarily limited to the number described above.

The power managing ECU 20 is an ECU 19 having a function of managing power supply to the DCM 12, the CGW 13, the ECUs 19, and the like.

Figure 4:
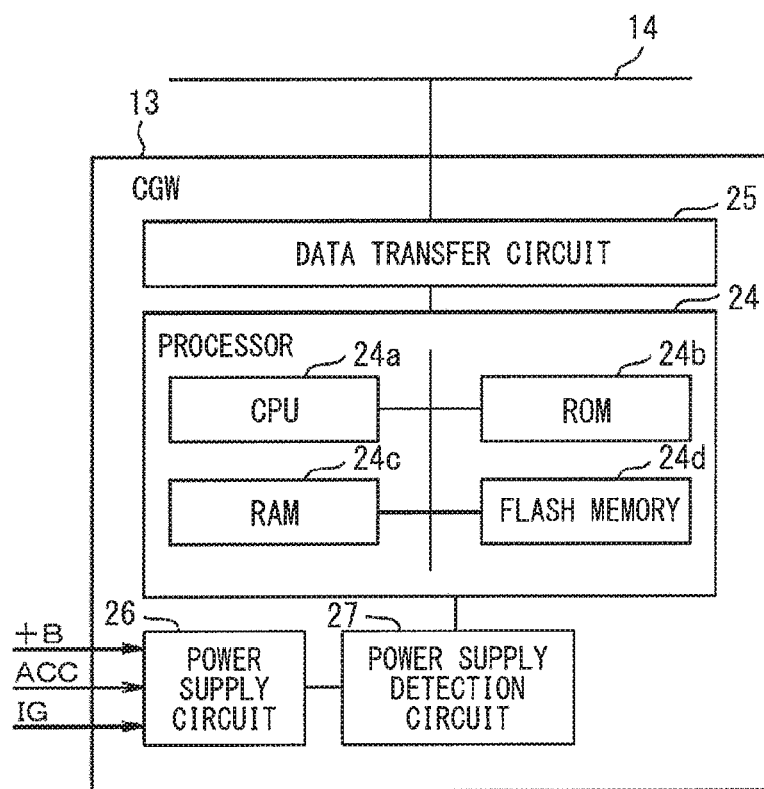
FIG. 4 is a diagram showing an electrical configuration of a CGW.

As shown in FIG. 4, the CGW 13 includes, as electrically functional blocks, a microprocessor 24, a data transfer circuit 25, a power supply circuit 26, and a power supply detection circuit 27. The microprocessor 24 includes a CPU (Central Processing Unit) 24a, a ROM (Read Only Memory) 24, a RAM (Random Access Memory) 24c, and a flash memory 24d. The microprocessor 24 executes various control programs stored in a non-transitional tangible storage medium to perform various types of processing, thereby controlling the operation of the CGW 13.

The data transfer circuit 25 controls data communication with the buses 14 to 18 and 21 in accordance with CAN data communication standards and diagnostic communication standards. The power supply circuit 26 inputs a battery power supply (hereinafter referred to as +B power supply), an accessory power supply (hereinafter referred to as an ACC power supply), and an ignition power supply (hereinafter referred to as an IG power supply). The power supply detection circuit 27 detects a voltage value of the +B power supply, a voltage value of the ACC power supply, and a voltage value of the IG power supply input by the power supply circuit 26, compares these detected voltage values with a predetermined voltage threshold, and outputs comparison results to the microprocessor 24. The microprocessor 24 determines whether the +B power supply, the ACC power supply, and the IG power supply that are externally supplied to the CGW 13 are normal or abnormal based on the comparison results input from the power supply detection circuit 27.

Figure 5:
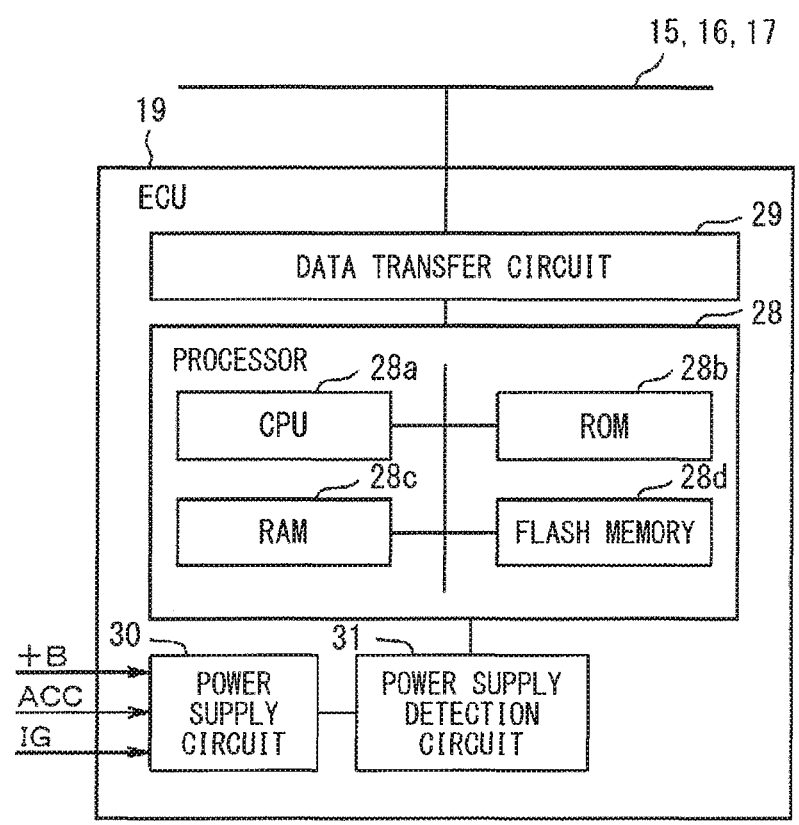
FIG. 5 is a diagram showing an electrical configuration of an ECU.

As shown in FIG. 5, each of the ECUs 19 includes, as electrically functional blocks, a microprocessor 28, a data transfer circuit 29, a power supply circuit 30, and a power supply detection circuit 31. The microprocessor 28 includes a CPU 28a, a ROM 28b, a RAM 28c, and a flash memory 28d. The microprocessor 28 executes control programs stored in a non-transitional tangible storage medium to perform various types of processing, thereby controlling the operation of the ECUs 19.

The data transfer circuit 29 controls data communication with the buses 15 to 17 in accordance with CAN data communication standards. The power supply circuit 30 inputs the +B power supply, the ACC power supply, and the IG power supply. The power supply detection circuit 31 detects a voltage value of the +B power supply, a voltage value of the ACC power supply, and a voltage value of the IG power supply input by the power supply circuit 30, compares these detected voltage values with a predetermined voltage threshold, and outputs comparison results to the microprocessor 28. The microprocessor 28 determines whether the +B power supply, the ACC power supply, and the IG power supply that are externally supplied to the ECUs 19 are normal or abnormal based on the comparison results input from the power supply detection circuit 27. It should be noted that each of the ECUs 19 basically has the same structures as others, although the loads such as sensors and actuators connected to each ECU 19 are different from each other. The basic configurations of the DCM 12 and the power management ECU 19 are the same as those of the ECUs 19 shown in FIG. 4.

Figure 6:
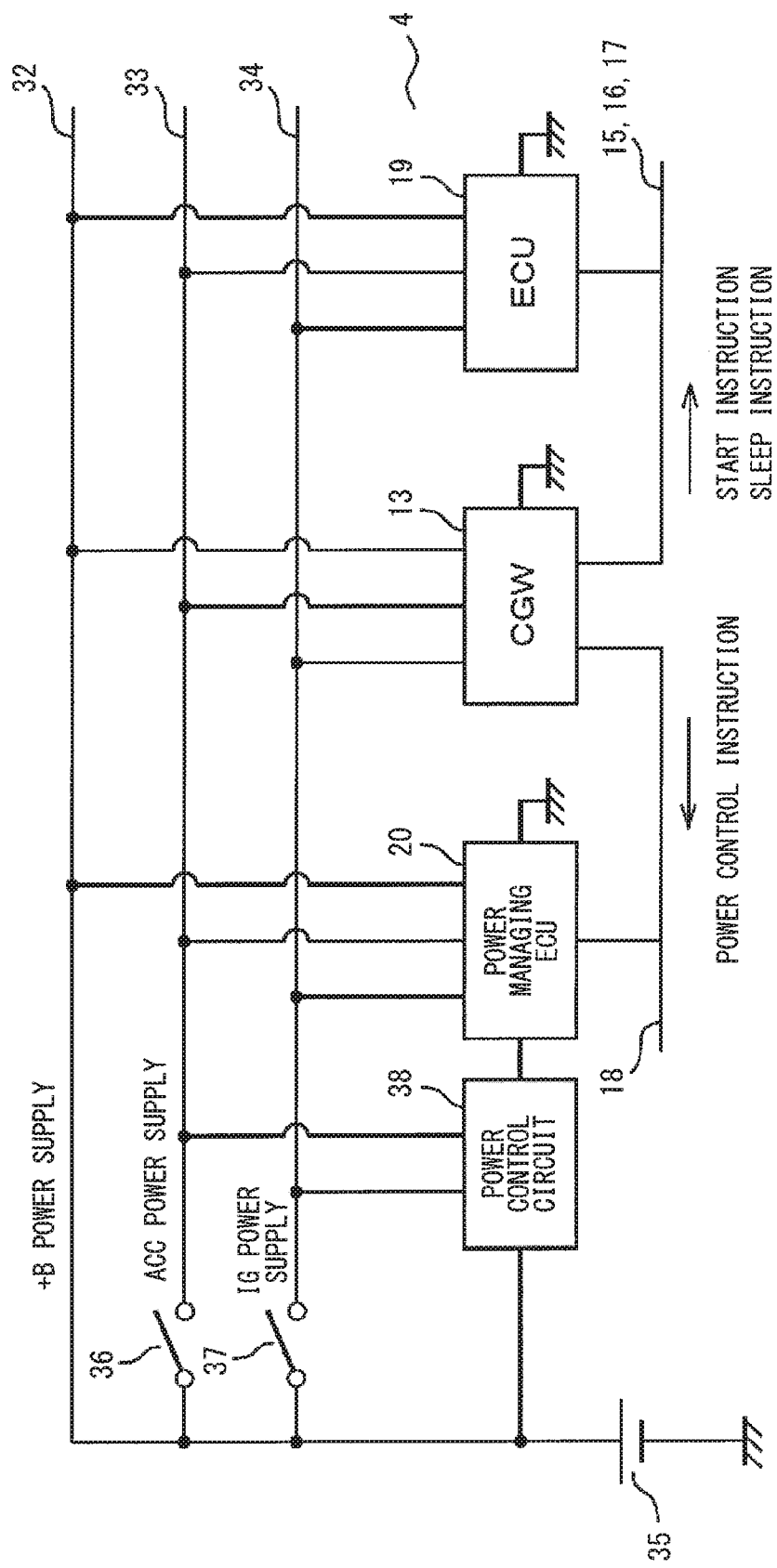
FIG. 6 is a block diagram showing power supply lines of a vehicle device.

As shown in FIG. 6, the power managing ECU 20, the CGW 13, and the ECU 19 are connected to a +B power supply line 32, an ACC power supply line 33, and an IG power supply line 34. The +B power supply line 32 is connected to a positive electrode of the vehicle battery 35. The ACC power supply line 33 is connected to a positive electrode of the vehicle battery 35 through an ACC switch 36. When a user performs an ACC operation, the ACC switch 36 is turned on, and an output voltage of the vehicle battery 35 is applied to the ACC power supply line 33. The ACC operation includes, for example, an operation in which a user inserts a key into an insertion hole and rotates it from the "OFF" position to the "ACC" position when the vehicle has such an insertion hole into which the key is inserted. When the vehicle has an engine start button, the ACC operation includes an operation in which a user presses the start button once.

The IG power supply line 34 is connected to a positive electrode of the vehicle battery 35 through an IG switch 37. When a user performs an IG operation, the IG switch 37 is turned on, and an output voltage of the vehicle battery 35 is applied to the IG power supply line 34. The IG operation includes, for example, an operation in which a user inserts a key into an insertion hole and rotates it from the "OFF" position to the "ON" position when the vehicle has such an insertion hole into which the key is inserted. When the vehicle has an engine start button, the IG operation includes an operation in which a user presses the start button twice. A negative electrode of the vehicle battery 35 is grounded.

When both the ACC switch 36 and the IG switch 37 are off, only the +B power supply is supplied to the vehicle device 4. Hereinafter, a state in which only the +B power supply is supplied to the vehicle device 4 is referred to as a +B power supply state. When the ACC switch 36 is on and the IG switch 37 is off, the ACC power supply and the +B power supply are supplied to the vehicle device 4. Hereinafter, a state in which both the ACC supply and the +B power supply are supplied to the vehicle device 4 is referred to as an ACC power supply state. When both the ACC switch 36 and the IG switch 37 are on, the +B power supply and the ACC power supply are supplied to the vehicle device 4. Hereinafter, a state in which all the +B power supply, the ACC supply and the IG power supply are supplied to the vehicle device 4 is referred to as an IG power supply state.

The ECUs 19 have different start conditions (activation condition) according to the power supply state, and may be divided into a +B system ECUs 19 which starts in the +B power state, ACC system ECUs 19 which starts in the ACC power state, and IG system ECUs 19 which starts in the IG power state. For example, the ECU 19 used for preventing a vehicle theft is a +B-system ECU 19. For example, the ECU 19 for use in a non-traveling system such as an audio system is an ACC-system ECU 19. For example, the ECU 19 for use in a an engine system such as an engine control is an IG-system ECU 19.

The CGW 13 transmits an activation instruction to the ECUs 19 in sleep mode, thereby changing the ECU 19 from the sleep mode to active mode. The CGW 13 transmits a sleep instruction to the ECUs 19 in the active mode, thereby changing the ECU 19 from the active mode to the sleep mode. The CGW 13 selects one of the ECUs 19 to which the activation instruction or the sleep instruction is transmitted from among the plurality of ECUs 19 by, for example, changing waveforms of transmission signals to be transmitted to the buses 15 to 17.

A power control circuit 38 is connected in parallel to the ACC switch 36 and the IG switch 37. The CGW 13 transmits a power control instruction to the power managing ECU 20, and causes the power managing ECU 20 to control the power control circuit 38. That is, the CGW 13 transmits a start instruction as the power control request to the power managing ECU 20, and causes the ACC power line 33 and the IG power line 34 to be connected to the positive electrode of the vehicle battery 35 inside the power control circuit 38. Under the control, the ACC power or IG power is supplied to the vehicle apparatus 4 even if the ACC switch 36 or the IG switch 37 is off. The CGW 13 transmits a power stop request as the power control instruction to the power managing ECU 20, and causes the ACC power line 33 and the IG power line 34 to be connected to the positive electrode of the vehicle battery 35 inside the power control circuit 38.

Upon receiving the rewrite difference data from the CGW 13, each of the ECUs 19 rewrites the application program in the flash memory 28d using the rewrite difference data. In the configuration described above, the CGW 13 serves as a reprogramming master that transmits the difference data to the target ECUs 19 when receiving an instruction to transmit the rewrite difference data from the target ECUs 19. Each of the target ECUs 19 serves as a reprogramming slave that rewrites its application programs by writing the difference data onto the flash memory 28d when receiving the rewrite difference data from the CGW 13.

Next, the detailed configuration of the flash memory 28d of each of the ECUs 19 will be described with reference to FIGS. 7 to 12. As a type (or a memory structure) of the flash memory 28d mounted in each of the ECUs 19, there are three type of memories: a single type memory having a physically independent single memory region onto which the application programs are written; a single suspended type memory having two pseudo memory regions formed by virtually dividing a physically independent single memory region into the two pseudo memory regions; and a multiple type memory having two or more physically independent single memory regions. In the following description, a dual type memory having two physically independent memory regions is described as a multiple type memory, but the multiple type memory may have three or more physically independent memory regions. One of the two memory regions of the dual type memory can be used as an operation region and the other of the two memory regions can be used as a non-operation region. Therefore, the application program can be rewritten onto the non-operation region while executing the application program written on the operation region. Thus, the ECU 19 having the dual type memory can rewrite the application programs regardless of whether the vehicle is parked or in operation. In other words, the dual type memory supports Read While Write (RWW) operation. On the contrary, the single type memory has only a single physically independent memory region. As a result, there is no concept of the operation region and the non-operation region in the singly type memory, and therefore the application program cannot be rewritten onto the single type memory while the application program is being executed. Therefore, the ECU 19 having the singly type memory can rewrite the application programs only when the vehicle is parked. For this reason, the single type memory does not support the RWW operation.

It should be noted that both a reprogram firmware embedded type in which a reprogram firmware is incorporated and a reprogram firmware download type in which a reprogram firmware is externally downloaded may be adopted for the single type memory, the single suspended type memory, and the dual type memory. The reprogram firmware is a firmware for controlling the ECU 19 as hardware to rewrite the application programs of the ECU 19. In the present embodiment, all the ECUs 19 are the reprogram firmware embedded types will be described, but ECUs 19 of the reprogram firmware download type may be used. In the following description, the ECU 19 having a single type memory is referred to as a single type ECU 19, the ECU 19 having a single suspended memory is referred to as a single suspended type ECU 19, and the ECU 19 having a dual type memory may be referred to as a dual type ECU 19.

(A) Single Type Memory

Figure 7:
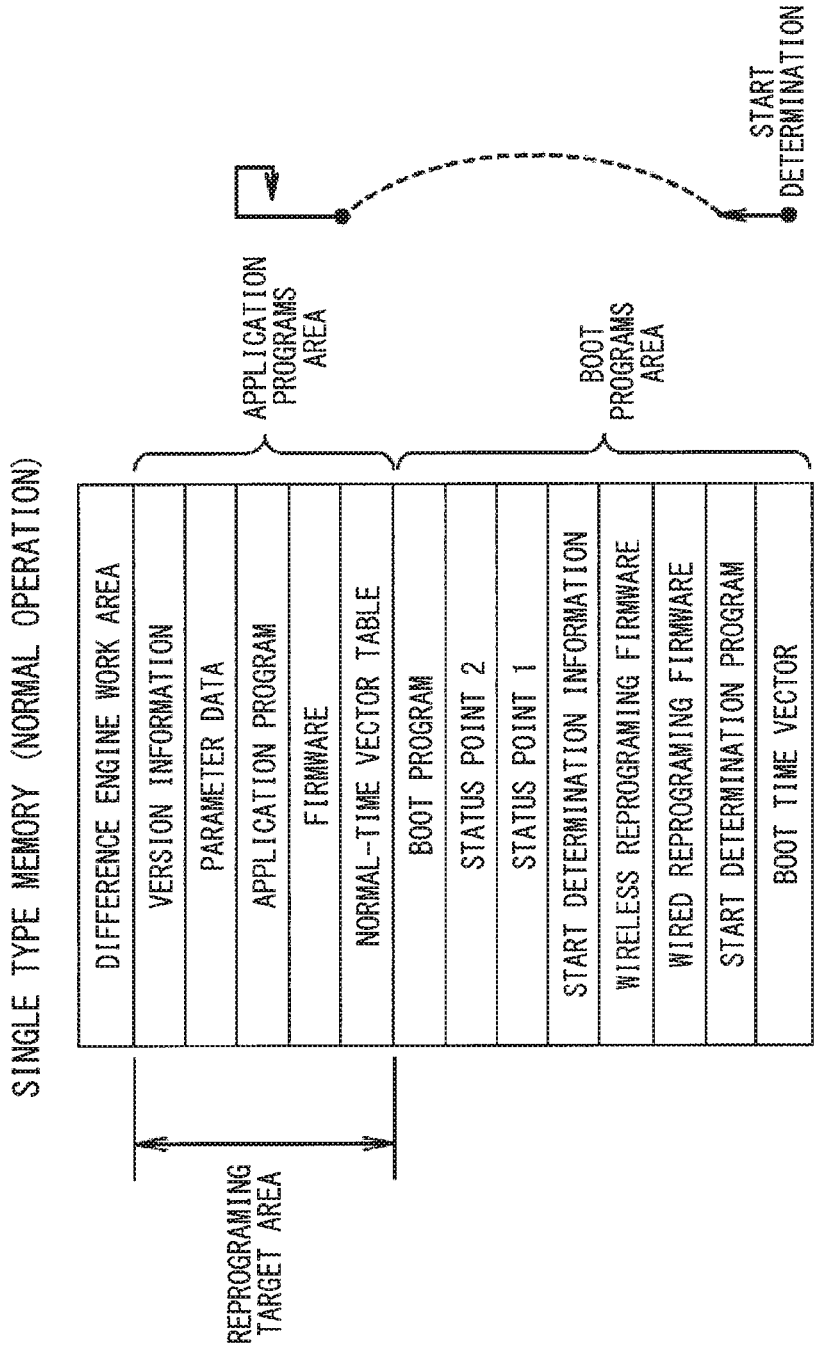
FIG. 7 is a diagram showing a single type memory having a single memory region in a normal operation.
Figure 8:
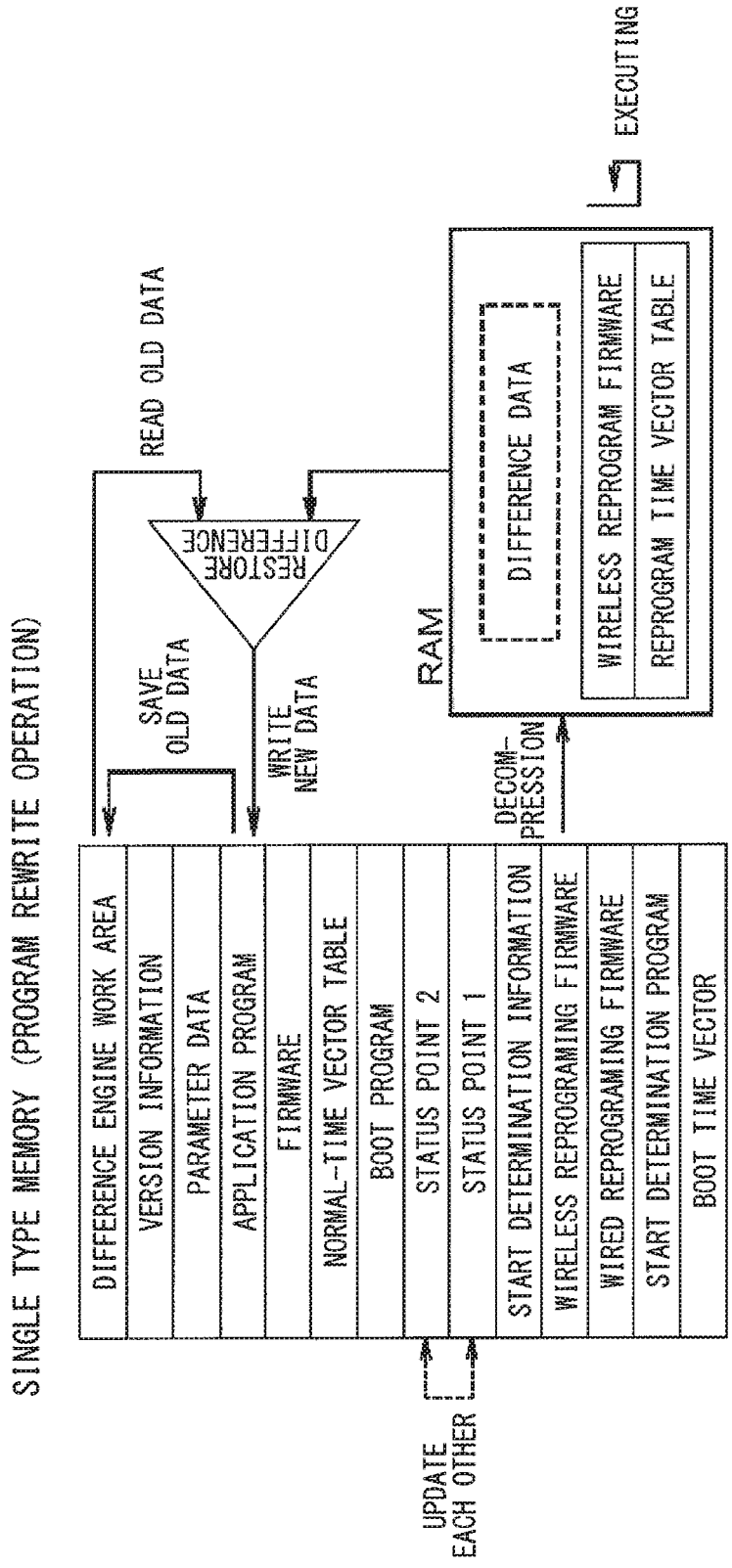
FIG. 8 is a diagram showing the single type memory having the single memory region in a rewrite operation.

As shown in FIGS. 7 and 8, the single type memory includes a difference engine work area, an application program area, and a boot program area. In the application program area, version information, parameter data, an application program, firmware, and a normal-time vector table are arranged. In the boot area, a boot program, status point 2, status point 1, start determination information, a wireless reprogramming firmware, a wired reprogramming firmware, a start determination program, and a boot time vector table are arranged.

During normal operation where application processing such as vehicle control processing and diagnosis processing is performed, the microprocessor 28 executes a boot determination program as shown in FIG. 7, searches the start address by referring to the boot time vector table and the normal time vector table, and then executes the application program.

During programs rewrite operation for rewriting an application program, the microprocessor 28 temporarily saves the application program in the difference engine work area as old data as shown in FIG. 8. Then, the microprocessor 28 reads the old data temporarily saved in the difference engine work area, and restores new data from the old data and the rewrite difference data stored in the RAM 28c through the incorporated reprogram firmware. When the microprocessor 28 generates the new data from the old data and the rewrite difference data, the microprocessor 28 rewrites the application program by writing the new data on to the memory 28d.

(B) Single Suspended Type Memory

Next, the single suspended type memory will be described with reference to FIGS. 9 and 10. The single suspended type memory includes a difference engine work area, an application program area, and a boot program area. The application program area is virtually divided into a memory region (a virtually divided memory region) A and a memory region (a virtually divided memory region) B, and version information, an application program, and a normal time vector table are arranged in each of the memory region A and the memory region B. In the boot area, a boot program, a reprogramming firmware, a reprogramming vector table, an active region determination function, active region determination information, and a boot vector table are arranged.

Figure 9:
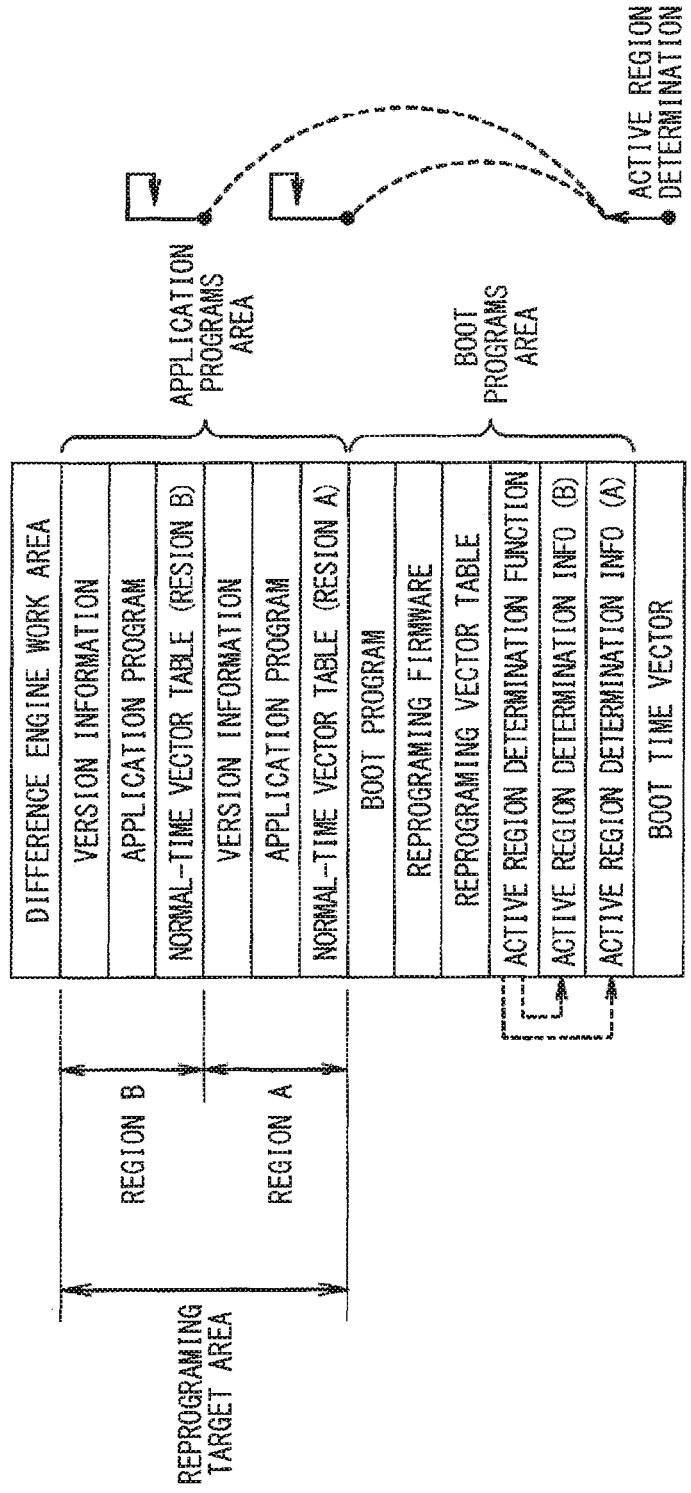
FIG. 9 is a diagram showing a single suspended type memory having a virtually divided single memory region in a normal operation.

During normal operation as shown in FIG. 9 in which application processing such as vehicle control processing and diagnosis processing is executed, the microprocessor 28 executes the boot program and judges which region is an operation region between the memory region A and the memory region B by determining whether the program on each of the memory region A and the memory region B is new or old based on the active region determination information for each of the memory regions A and B through an active region determination function. When the microprocessor 28 determines that the memory region A is the operation region, the microprocessor 28 searches for the head address by referring to the normal time vector table of the memory region A, and executes the application program in the memory region A. Similarly, when the microprocessor 28 determines that the memory region B is the operation region, the microprocessor 28 searches for the head address by referring to the normal time vector table of the memory region B, and executes the application program in the memory region B.

Figure 10:
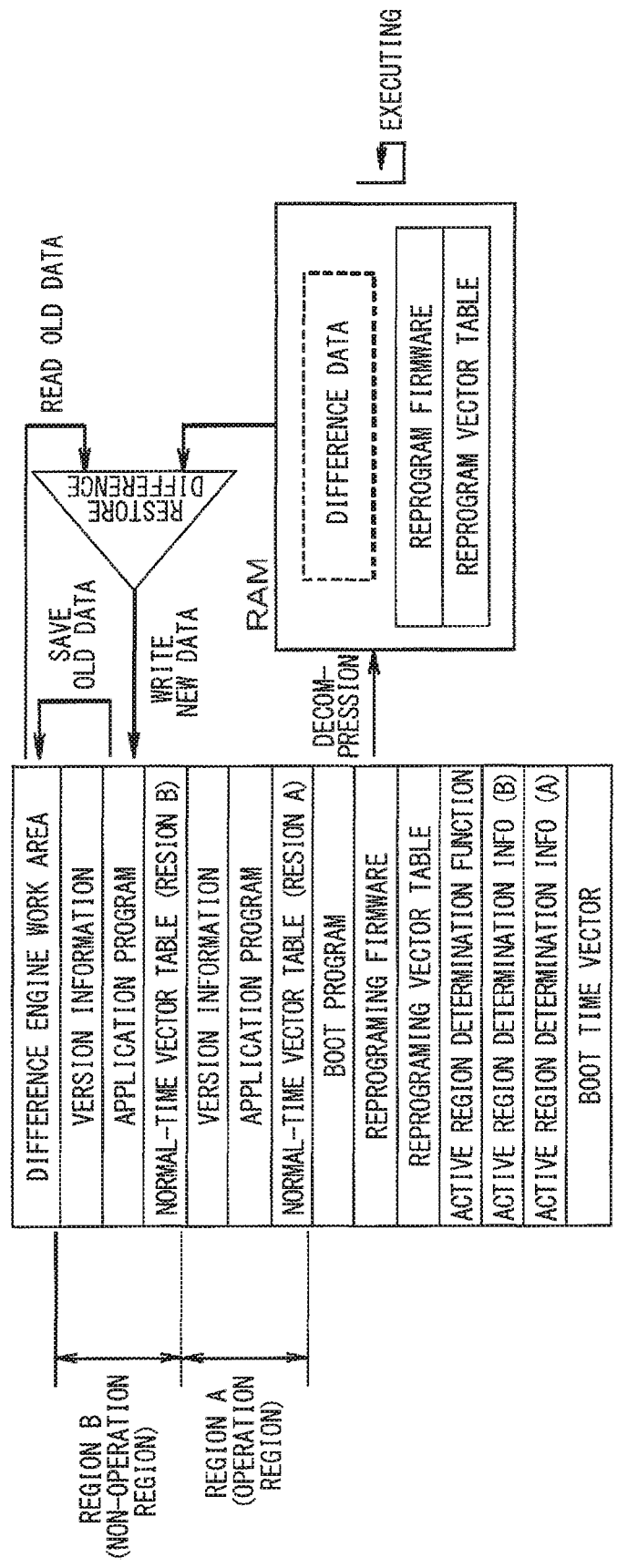
FIG. 10 is a diagram showing the single suspended type memory having the virtually divided single memory region in a write operation.

During programs rewrite operation for rewriting an application program in the non-operation region, the microprocessor 28 temporarily saves the application program in the difference engine work area from the non-operation region as old data as shown in FIG. 10. Then, the microprocessor 28 reads the old data temporarily saved in the difference engine work area, and restores new data from the old data and the rewrite difference data stored in the RAM 28c through the incorporated reprogram firmware. When the microprocessor 28 generates the new data from the old data and the rewrite difference data, the microprocessor 28 rewrites the application program by writing the new data onto the non-operation region. In FIG. 10, the memory region A is the operation region and the memory region B is the non-operation region.

(C) Dual Type Memory

Next, the dual type memory will be described with reference to FIGS. 11 and 12. The dual type memory has an application program area and a rewrite program area for a memory region (a physically independent memory region) A, an application program area and a rewrite program area for a memory region (a physically independent region) B, and a boot program area. In the application program area, version information, parameter data, an application program, a firmware, and a normal-time vector table are arranged. In each of the rewrite program areas, rewriting programs, reprogramming progress managing information 2, reprogramming progress managing information 1, active region determination information, wireless reprogramming firmware, wired reprogramming firmware, and a boot time vector table are arranged. In the boot area, a boot program, a boot swap function, and a boot time vector table are arranged.

Figure 11:
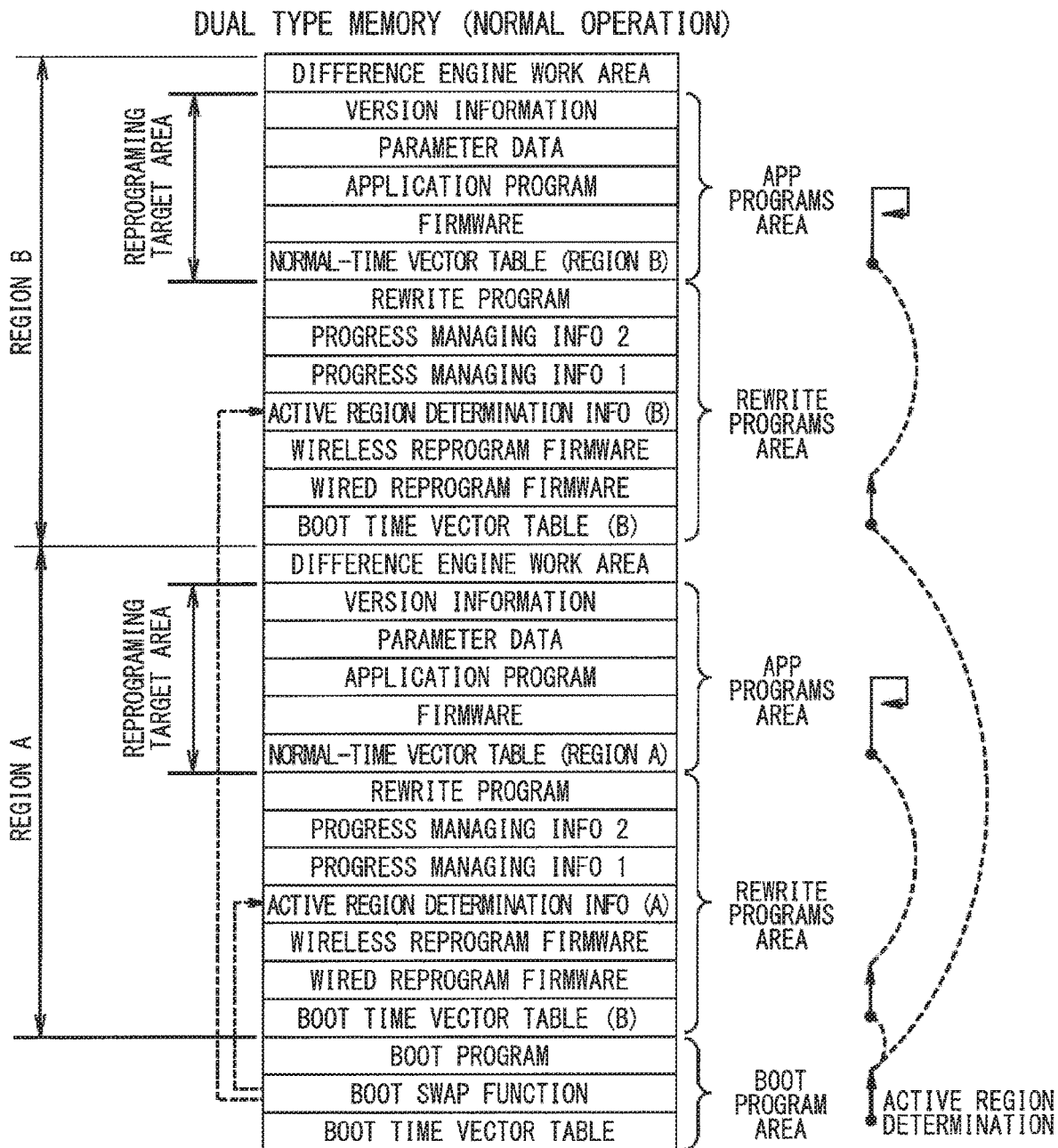
FIG. 11 is a diagram showing a dual type memory having double memory regions in a normal operation.

During normal operation as shown in FIG. 11 in which application processing such as vehicle control processing and diagnosis processing is executed, the microprocessor 28 executes the boot program and judges which region is an operation region between the memory region A and the memory region B by determining whether the program on each of the memory region A and the memory region B is new or old based on the active region determination information for each of the memory regions A and B through an active region determination function. When the microprocessor 28 determines that the memory region A is the operation region, the microprocessor 28 searches for the head address by referring to the boot time vector table and the normal time vector table for the memory region A, and executes the application program in the memory region A. Similarly, when the microprocessor 28 determines that the memory region B is the operation region, the microprocessor 28 searches for the head address by referring to the boot time vector table and the normal time vector table for the memory region B, and executes the application program in the memory region B.

Figure 12:
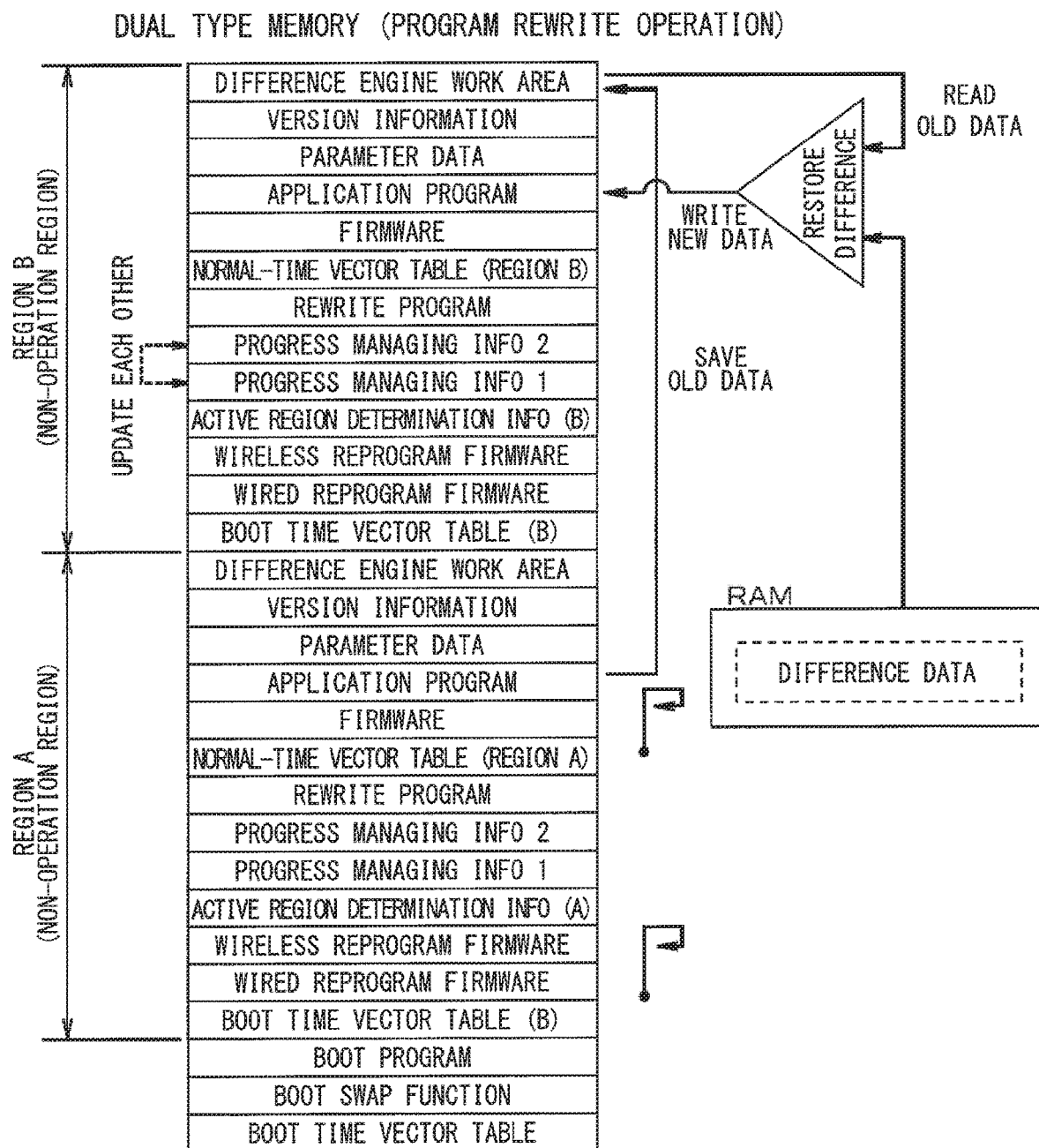
FIG. 12 is a diagram showing the dual type memory having the double memory regions in a rewrite operation.

During programs rewrite operation for rewriting an application program in the non-operation region, the microprocessor 28 temporarily saves the application program in the difference engine work area from the operation region as old data as shown in FIG. 12. Then, the microprocessor 28 reads the old data temporarily saved in the difference engine work area, and restores new data from the old data and the rewrite difference data stored in the RAM 28c through the incorporated reprogram firmware. When the microprocessor 28 generates the new data from the old data and the rewrite difference data, the microprocessor 28 rewrites the application program by writing the new data onto the non-operation region. In FIG. 12, the memory region A is the operation region and the memory region B is the non-operation region. It should be noted that the old data to be temporarily saved in the difference engine work area may be an application program in the operation region, or may be an application program in the non-operation region.

Figure 13:
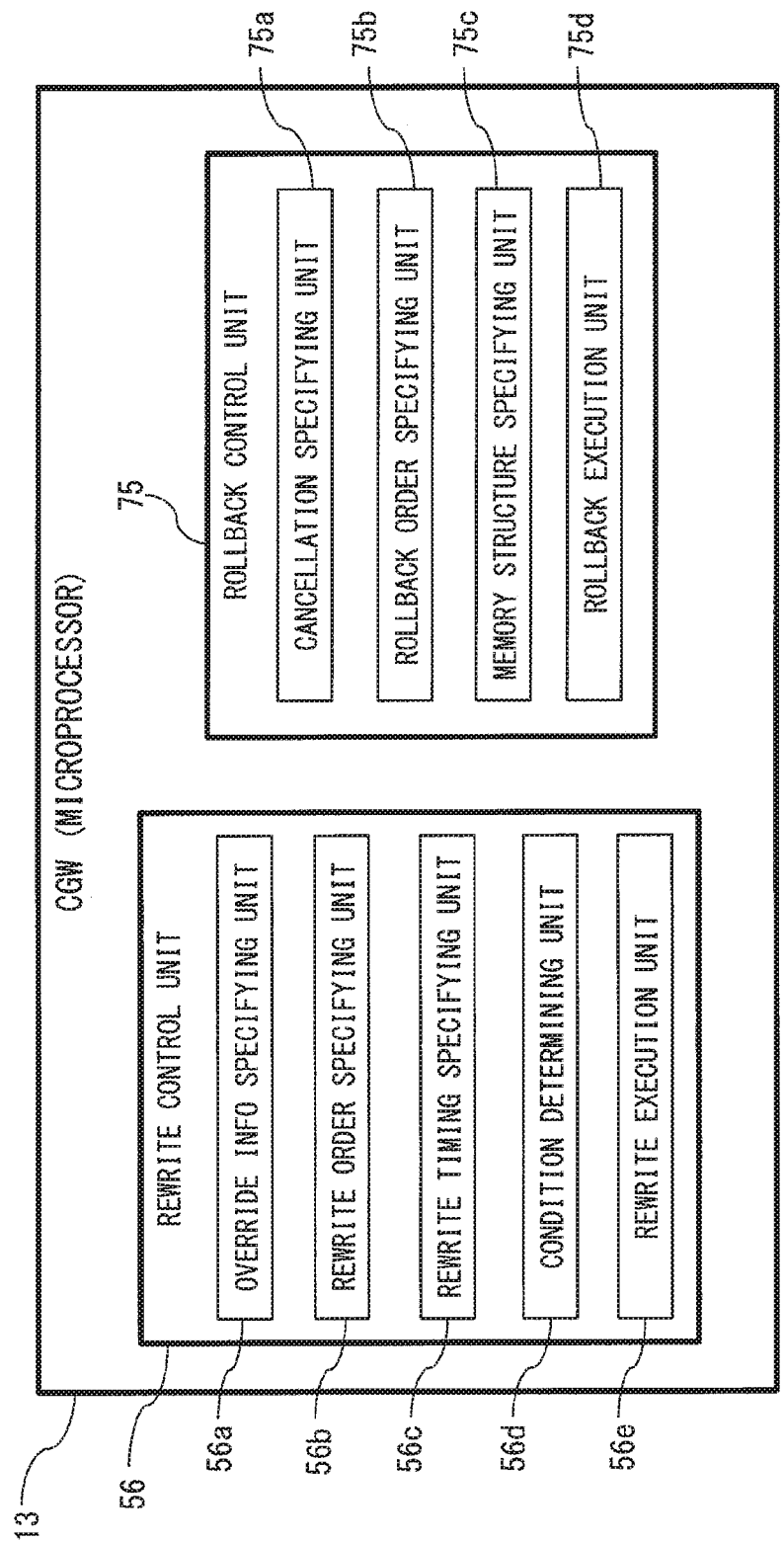
FIG. 13 shows a functional block diagram of the CGW.

Next, a specific configuration for realizing update control for the ECUs 19 by the CGW 13 will be described below. As shown in FIG. 13, the CGW 13 (the microprocessor 24) includes a program rewrite control unit 56 and a rollback control unit 75 as functional blocks.

The program rewrite control unit 56 controls the timing and execution of rewriting (installing) of application programs for at least one target ECU 19. The program rewrite control unit 56 includes an override information specifying unit 56a, a rewrite order specifying unit 56b, a rewrite timing specifying unit 56c, a rewrite condition determining unit 56d, and a program rewrite execution unit 56e. The override information specifying unit 56a analyzes the specification data 50 and identifies the override information 9. That is, the override information specifying unit 56a confirms whether or not the specification data 50 includes the override information 9 in the specification data 50. Then, when the override information 9 is included, the override information specifying unit 56a determines from the information whether the rewriting of the target ECU 19 is restricted to when the vehicle is parked.

The rewrite order specifying unit 56b analyzes the specification data table 52, and when there are a plurality of target ECUs 19, the rewrite order specifying unit 56b determines which target ECU 19 is the first ECU to which the program rewrite is performed. Specifically, the rewrite order specifying unit 56b specifies an order (a rewrite order) in which the specification data 50 corresponding to the plurality of target ECUs 19 are arranged in the specification data table 52 by analyzing the specification data table 52 transmitted from the center device 3. Then, the program rewrite execution unit 56e performs program rewrites for the plurality of target ECUs 19 one by one in the rewrite order specified by the rewrite order specifying unit 56b.

The rewrite timing specifying unit 56c analyzes the specification data 50 and specifies the memory structure corresponding to the target ECU 19. Then, from the memory structure, the rewrite timing specifying unit 56c specifies whether the timing of program rewrite for the target ECU 19 is restricted to only when the vehicle is parked or to when the vehicle is either parked or in operation. Specifically, the rewrite timing specifying unit 56c specifies the memory structure of the target ECU 19 from the memory structure information 8 included in the specification data 50 corresponding to the target ECU 8. In the present embodiment, the program rewrite to the flash memory 28d is restricted to when the vehicle is parked when the memory structure information 8 indicates the target ECU 19 has the single type memory or the single suspended type memory. On the other hand, the program rewrite to the flash memory 28d is allowed regardless of whether the vehicle is parked or in operation when the memory structure information 8 indicates the target ECU 19 has the dual type memory. Therefore, if the memory structure information 8 included in the specification data 50 indicates the single type memory or the single suspend type memory, the rewrite timing specifying unit 56c determines that the program rewrite for the target ECU 19 is restricted to when the vehicle is parked. In contrast, if the memory structure information 8 included in the specification data 50 indicates the dual type memory, the rewrite timing specifying unit 56c determines that the program rewrite for the target ECU 19 is performed when the vehicle is either parked or in operation. However, when the override information specifying unit 56a identifies the override information 9 that restricts program rewrites only to when the vehicle is parked, the program rewrites for all the target ECUs 19 are allowed only when the vehicle is parked even if one of the target ECUs 19 has the dual type memory. It should be noted that "the vehicle is in operation" may be construed to include when the vehicle is stopped while the ignition power supply is on, as well as when the vehicle is traveling. That is, "the vehicle is in operation" can be construed to include "the vehicle is in a state capable of traveling."

The rewrite condition determining unit 56d determines whether a rewrite condition for each of the target ECUs 19 that is specified by the override information specifying unit 56a and the rewrite timing specifying unit 56c is met. That is, the rewrite condition determining unit 56d determines whether the rewrite condition for each of the target ECUs 19 matches the current state of the vehicle (i.e., parked or in operation). When the rewrite condition determining unit 56d determines that the current state of the vehicle satisfies the rewrite condition for the target ECU 19, the program rewrite execution unit 56e performs rewriting of the application program for the target ECU 19.

Next, the configuration of the rollback control unit 75 of the CGW 13 will be described. The rollback control unit 75 executes a rollback for the ECU 19 when the program rewrite is canceled while the program rewrite is being performed for one of the target ECUs 19. As shown in FIG. 13, the rollback control unit 75 includes a cancellation instruction specifying unit 75a, a rollback order specifying unit 75b, a memory structure specifying unit 75c, and a rollback execution unit 75d. The cancellation instruction specifying unit 75a determines whether a cancellation instruction to cancel the program rewrite while the program rewrite is being performed. For example, when a user cancels the rewriting of an application program through a display of a mobile phone or a vehicle, the CGW 13 is notified of the cancellation instruction. When there are a plurality of target ECUs 19, the rollback order specifying unit 75b specifies an order (a rollback order) in which rollbacks are performed for the plurality of target ECUs whose program data rewrites have been already completed (hereinafter, may be referred to as a "rewrite completed ECU" 19) at the time the cancellation instruction arises.

Similarly to the rewrite order specifying unit 56b described above, the rollback order is the same as the rewrite order in which the specification data 50 corresponding to the rewrite completed ECUs 19 are arranged in the specification data table 52. That is, the rollback order specifying unit 75b specifies the order in which the specification data 50 corresponding to the rewrite completed ECUs 19 are arranged in the specification data table 52 transmitted from the center device 3. Then, the rollback execution unit 75d executes rollbacks for the rewrite completed ECUs 19 in the order specified by the rollback order specifying unit 75b. In the present embodiment, upon receiving an instruction to cancel the program data rewrites when the program data rewrites of the plurality of target ECUs 19 are currently partially completed, a rollback of the program data rewrite is performed first for the target ECU 19 whose program data rewrite is currently being performed. Then, after the rollback is performed for the ECU 19, and if there are two more rewrite completed ECUs 19, rollbacks for the rewrite completed ECUs 19 are performed in the rollback order as described above. The memory structure specifying unit 75c analyzes the specification data 50 and specifies the memory structure information 8 corresponding to the target ECU 19. That is, the memory structure specifying unit 75c determines, from the memory structure information 8 included in the specification data 50, whether the memory structure of the target ECU 19 is the single type, the single suspended type, or the dual type.

The rollback execution unit 75d performs a rollback to restore program data of the target ECU 19 to a previous state before the program rewrite was performed. Here, the rollback execution unit 75d selects the way of rolling back the target ECU 19 according to the memory structure information 8 specified by the memory structure specifying unit 75c. In the present embodiment, when the memory structure of the target ECU 19 is the single type, the rollback execution unit 75d transmits the rollback difference data to the target ECU 19 and rollbacks the application program of the update target ECU 19 using the rollback difference data. On the contrary, when the memory structure of the target ECU 19 is the single suspended type or the dual type, the rollback execution unit 75d does neither transmit the rollback difference data to the target ECU 19 nor perform a rollback with respect to the non-operation region to an previous version of the program. That is, a rollback is not performed to the ECU 19 having the dual type or the single suspended type. Further, when there are a plurality of rewrite completed ECUs 19, the rollback execution unit 75d executes rollbacks for these rewrite completed ECUs 19 in the rollback order specified by the rollback order specifying unit 75b.

Next, a method of rewriting and rolling back at least one target ECU 19 in the vehicle information communication system 1 of the present embodiment will be described by giving a plurality of specific examples.

Example 1

In Example 1, it is assumed that updating data (rewrite difference data and rollback difference data) only for one ECU 19 is stored in the ECU reprogramming data DB 6 by a supplier. Further, it is assumed that the override information 9 is not input by an OEM in the ECU information DB 5. In this example, the memory structure of the target ECU 19 is the single type, and the memory structure information 8 indicating so is stored in advance in the ECU information DB 5.

Figure 14:
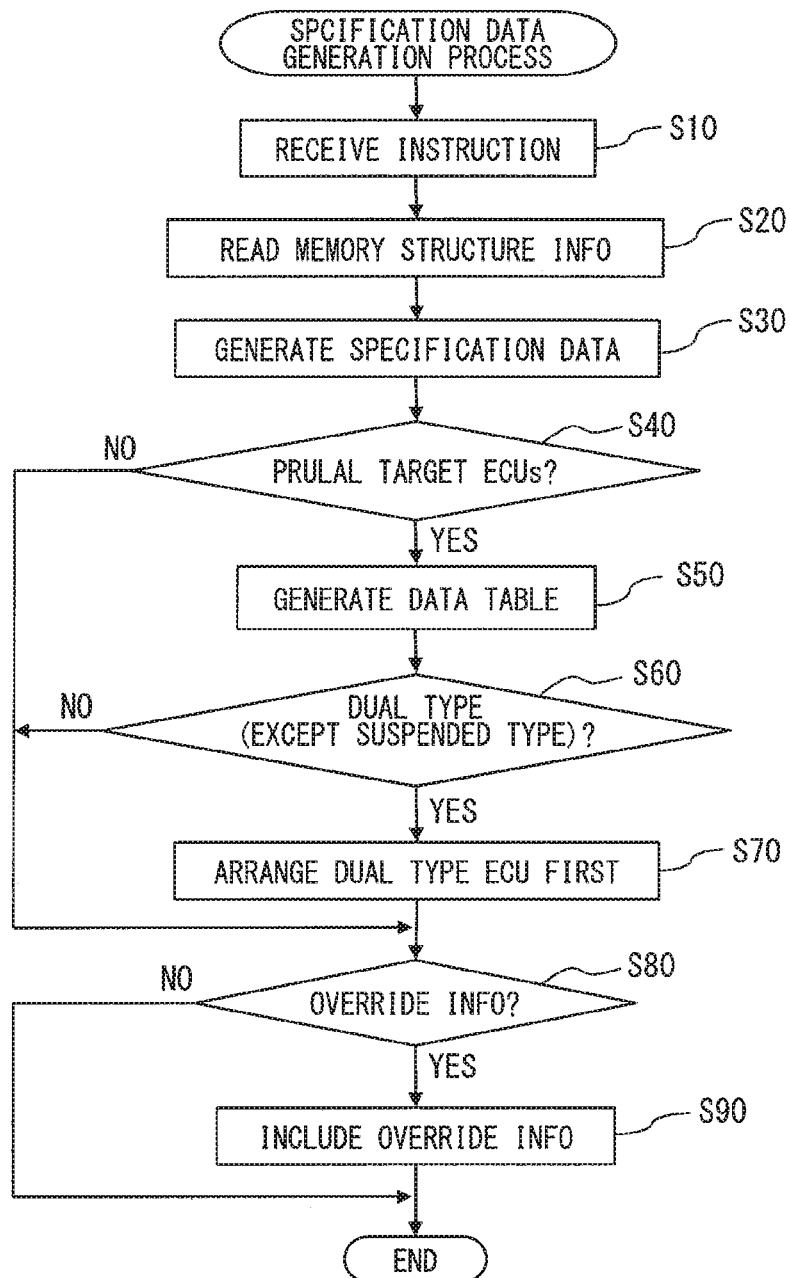
FIG. 14 is a flowchart showing a specification data generation process.

When the center device 3 receives an instruction to transmit updating data from a user, the center computer 10 (the specification data generation unit 10a) executes the specification data generation process as shown in FIG. 14. When the center device 3 receives the instruction to transmit the updating data from a user (Step S10), the center computer 10 reads out the memory structure information 8 indicating the single type of the target ECU 19 from the ECU information DB 5 (Step S20). Then, the center computer 10 generates the specification data 50 including the memory structure information 8 for the target ECU 19 (Step S30). Next, the center computer 10 determines whether there are a plurality of target ECUs 19 (Step S40). In Example 1, since there is only one target ECU 19 (Step S40: No), the process proceeds to Step S80.

At Step S80, the center computer 10 determines whether the override information 9 is set for the target vehicle for which the user sent the instruction to transmit the updating data. In Example 1, since the override information 9 is not set (Step S80: No) as described above, the specification data generation process ends. As a result, the center computer 10 generates specification data 50 for the target ECU 19 that includes the memory structure information (the single type) 8 and does not include the override information 9 (see FIG. 2A).

Figure 15:
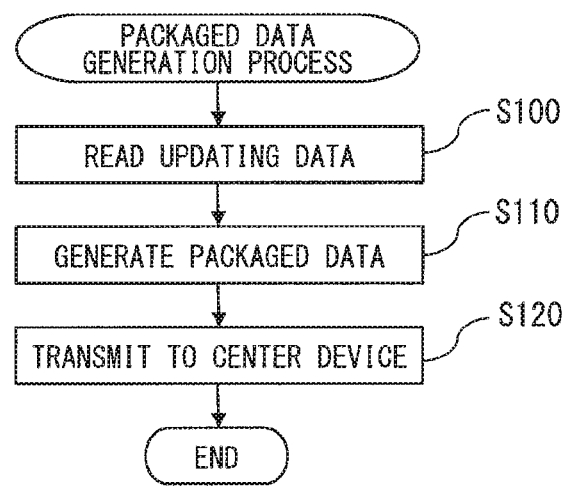
FIG. 15 is a flowchart showing a packaged data generation process.

When the specification data 50 is generated, the center computer 10 (i.e., the packaged data generation unit 10b) executes a packaged data generation process as shown in FIG. 15. First, the center computer 10 accesses to the ECU reprogramming data DB 6 and reads updating data (the rewrite difference data and the rollback difference data) for the target ECU 19 (Step S100). Next, the center computer 10 packages the updating data and the specification data 50 generated by the specification data generation process to generate the packaged data 54 (Step S110). Then, the center computer 10 transmits the generated packaged data 54 to the center-device communication unit 7 (Step S120), and then the package generation process ends.

When the center-device communication unit 7 receives the packaged data 54, the center-device communication unit 7 wirelessly transmits the packaged data 54 via the communication network 2 to the vehicle device 4 (the DCM 12) of the vehicle for which the instruction to transmit the updating data was sent by the user. When the DCM 12 receives the packaged data 54, it extracts the updating data and the specification data 50 for the target ECU 19 from the packaged data 54. Then, the DCM 12 transmits the extracted updating data and the specification data 50 to the CGW 13.

Figure 16:
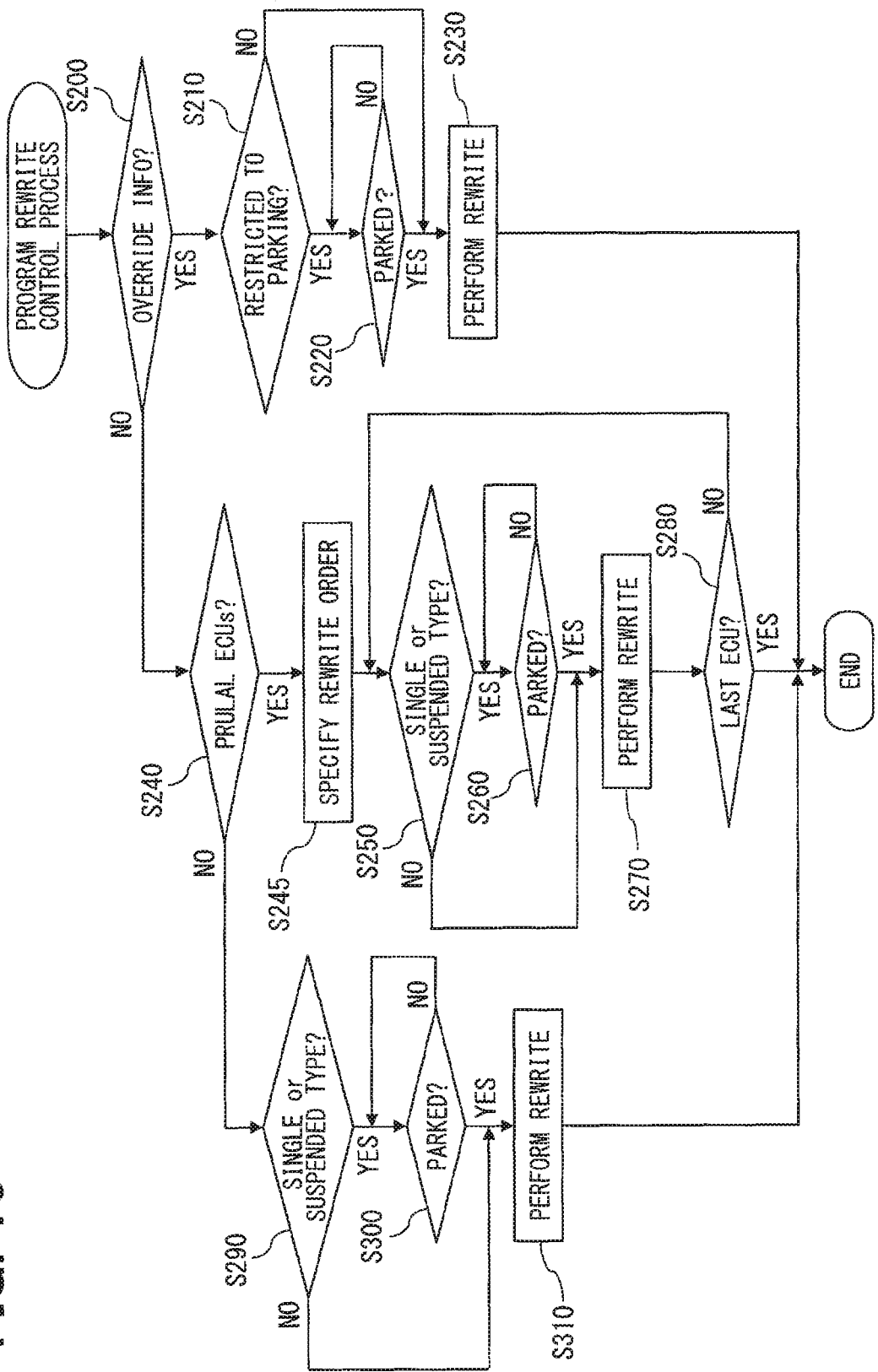
FIG. 16 is a flowchart showing a program rewrite control process.

When the updating data and the specification data 50 are received, the CGW 13 (the program rewrite control unit 56) executes a program rewrite control process as shown in FIG. 16. In the program rewrite control process, the CGW 13 (the override information specifying unit 56a) analyzes the specification data 50 first, and then specifies whether the override information 9 is set (Step S200). In Example 1, since the override information 9 is not set as described above, the process proceeds to Step S240. In Step S240, the CGW 13 (the rewrite order specifying unit 56b) analyzes the specification data 50, and determines whether there are a plurality of target ECUs 19 or not. In Example 1, since there is only one target ECU 19 (Step S240: No), the process proceeds to Step S290. At Step S290, the CGW 13 (the rewrite condition determining unit 56d) analyzes the specification data 50, and determines whether the memory structure information 8 indicates the memory structure of the target ECU 19 is a single type. In Example 1, since the memory structure of the target ECU 19 is the single type (Step S290: Yes), the process proceeds to Step S300. At Step S300, the CGW 13 (the rewrite condition determining unit 56*d*) determines whether the vehicle is currently parked.

When the vehicle is traveling (the ignition switch is on) (Step S300: No), the CGW 13 (the rewrite condition determining unit 56*d*) does not execute the rewriting of the application program with respect to the target ECU 19 until the vehicle is determined to be parked. Then, when the vehicle is determined to be parked (Step S300: Yes), the CGW 13 (the program rewrite execution unit 56*e*) rewrites the application program of the target ECU 19 (Step S310).

As described above, according to the vehicle information communication system 1 of the present embodiment, the center device 3 generates the specification data 50 including the memory structure information 8 of the target ECU 19. Then, the vehicle device 4 performs a program data rewrite to the target ECU 19 based on the specification data 50. Therefore, flexible program rewrites in light of the memory structure of the target ECU 19 can be performed. Here, when the memory structure of the update target ECU 19 is a single type, the memory structure information 8 indicating the "single type" is included in the specification data 50. Thereby, the CGW 13 writes the updating data with respect to the target ECU 19 on condition that the vehicle is determined to be parked. Therefore, writing of the updating data to the ECU 19 that has the flash memory 28*d* of the singly memory type is prohibited while the vehicle is traveling.

In Example 1, if the memory structure of the target ECU 19 is the single suspended type, the program rewrite with respect to the target ECU 19 is executed as in the above-described program rewrite control process. That is, when the memory structure of the target ECU 19 is the single suspended type, an affirmative determination is made in Step S290, and rewriting of the target ECU 19 is allowed only when the vehicle is parked.

Figure 17A:
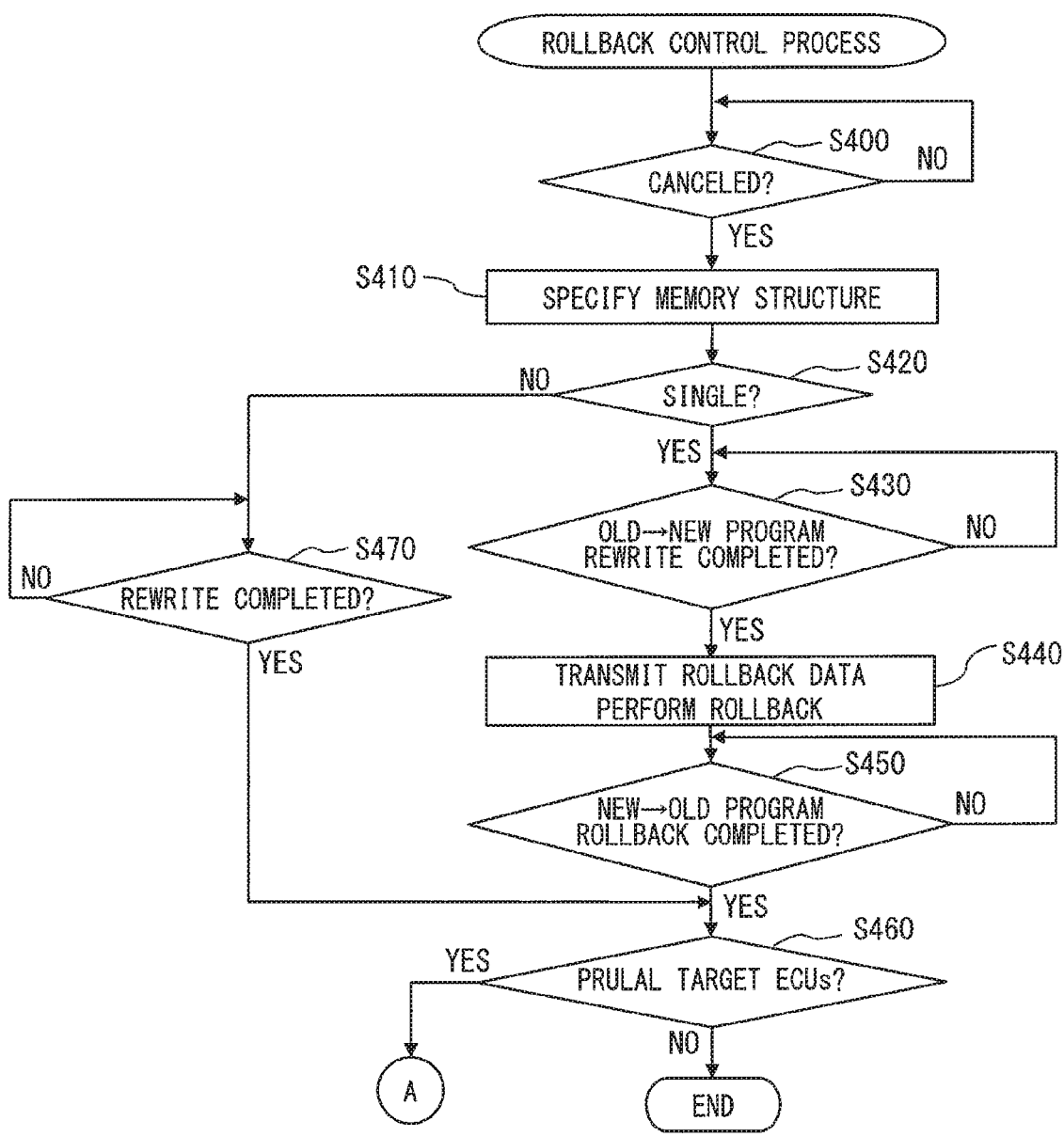
FIG. 17A is a flowchart showing a rollback control process.
Figure 17B:
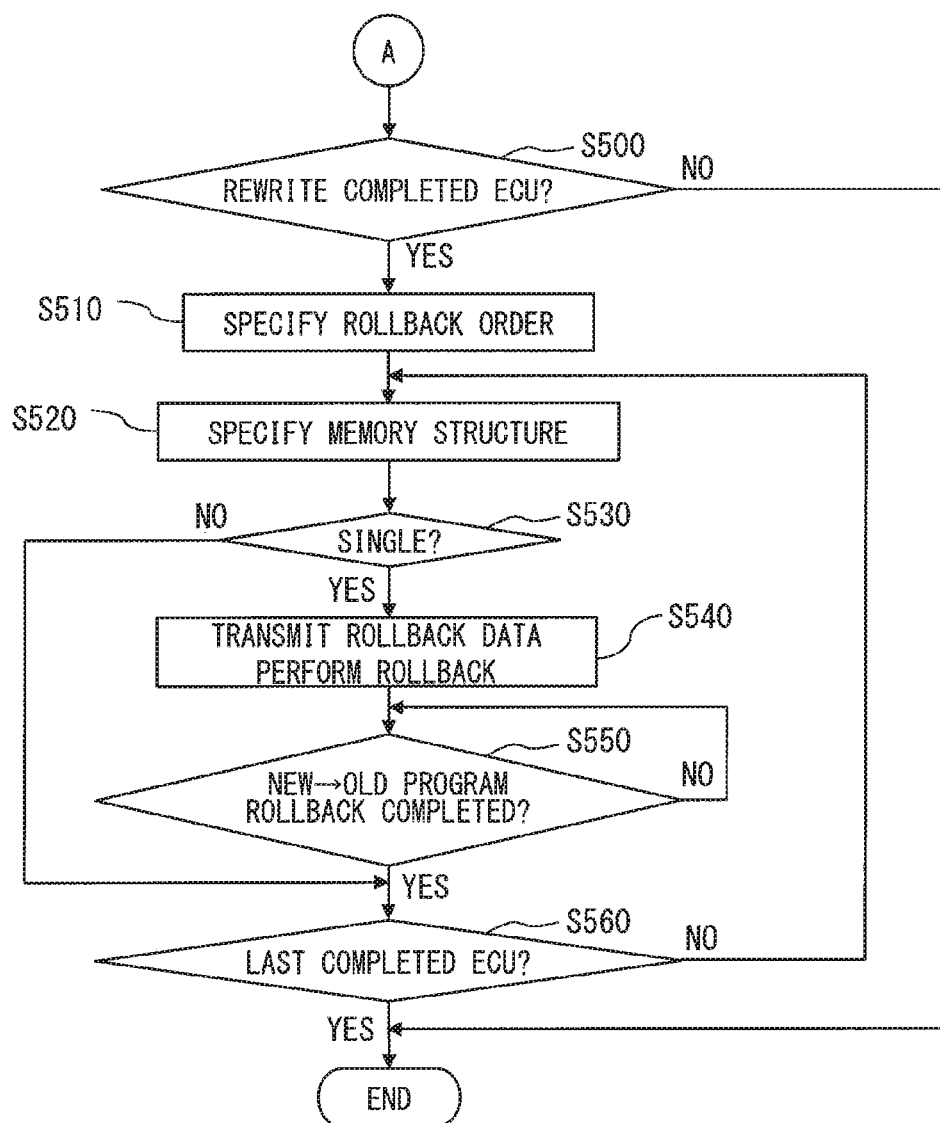
FIG. 17B is a flowchart showing a rollback control process when there are a plurality of target ECUs.

Next, a case where the user cancels the update (program rewrite) while rewriting the application program of the target ECU 19 under the same condition as Example 1 will be described. In this case, the CGW 13 (the rollback control unit 75) executes a rollback control process as shown in FIGS. 17A and 17B.

In the rollback control process, the CGW 13 (the cancellation instruction specifying unit 75*a*) determines whether a cancellation instruction is received from the user (Step S400). When a cancellation instruction is received from the user (Step S400: Yes), the CGW 13 (the memory structure specifying unit 75*c*) analyzes the specification data 50, and specifies the memory structure of the target ECU 19 whose the program is being rewritten at the time of the cancellation instruction (Step S410). That is, the memory structure specifying unit 75*c* determines, from the memory structure information 8 included in the specification data 50, whether the memory structure of the target ECU 19 is the single type, the single suspended type, or the dual type. In Example 1, since the memory structure of the target ECU 19 is the single type, the CGW 13 specifies the memory structure of the target ECU 19 as a single type.

Next, the CGW 13 (the rollback execution unit 75*d*) determines whether the specified memory structure is a single type (Step S420). In Example 1, since the memory structure of the target ECU 19 is the single type (Step S420: Yes), the process proceeds to Step S430. At Step S430, the CGW 13 (the rollback execution unit 75*d*) determines whether the rewriting of the application program of the target ECU 19 to a new version is completed. That is, even if the rewriting of the application program of the ECU 19 is canceled when the program data rewrite of the target ECU 19 is partially completed, the CGW 13 waits until the current program rewrite of the target ECU 19 is fully completed without stopping the program rewrite. Then, when the rewrite of the application program of the target ECU 19 is fully completed (Step S430: Yes), the CGW 13 (the rollback execution unit 75*d*) transmits the rollback difference data received from the DCM 12 to the target ECU 19, and performs a rollback with respect to the target ECU 19 (Step S440). Then, the target ECU 19 rolls back the application program to an old version (a previous version) from the new version using the rollback difference data. When the rollback of the target ECU 19 is completed (Step S450: Yes), the process proceeds to Step S460. At Step S240, the CGW 13 (the rollback order specifying unit 75*b*) analyzes the specification data 50, and determines whether there are a plurality of target ECUs 19 or not. In Example 1, since there is only one target ECU 19 (Step S460: No), the CGW 13 (the rollback control unit 75) terminates the rollback control process. It should be noted that if there are a plurality of target ECUs 19 (that is, when the determination in Step S460 is affirmative), the process proceeds to the flow of FIG. 17B as described later.

Here, if the memory structure of the target ECU 19 whose program is rewritten at the time of receiving the cancellation instruction is a dual type or a single suspended type, the CGW 13 (the rollback control unit 75) does not perform a rollback with respect to the target ECU 19. In that case, at Step S410, the CGW 13 (the memory structure specifying unit 75*c*) specifies that the memory structure of the target ECU 19 is the dual or single suspended type based on the structure information 8. Then, the CGW 13 (the rollback execution unit 75*d*) proceeds to Step S470 without performing a rollback on the target ECU 19 (Step S420: No). Then, the CGW 13 (the rollback execution unit 75*d*) determines whether the rewriting of the application program of the target ECU 19 to a new version is completed. That is, the CGW 13 stands by until the rewriting of the application program with the new version onto the non-operation region of the memory 28*d* of the target ECU 19 is completed. And then, when the rewriting of the application program of the target ECU 19 is complete (Step S470: Yes), the process proceeds to Step S460. That is, when the memory structure of the target ECU 19 is a dual or single suspended type, the CGW 13 terminates the rollback control process when the writing of the new version onto the non-operation region of the memory 28*d* is completed. Therefore, the application program of the new version remains on the non-operation region of the memory 28*d* of the target ECU 19. As a result, the ECU 19 executes the application program of the old version written in the operation region while the application program of the new version remains in the non-operation region.

As described above, according to the vehicle information communication system 1 according to the present embodiment, the CGW 13 selects the way of performing a rollback to the target ECU 19 according to the memory structure information 8 of the specification data 50 for the target ECU 19. Therefore, flexible rollbacks in light of the memory structure of the target ECU 19 can be performed. In particular, a rollback is only performed for the target ECU 19 that has a memory 28*d* of a single type. This is because the memory 28*d* of a dual or single suspended type has both the operation region and the non-operation region. Therefore, even when there is a cancellation instruction from a user, a rollback with respect to the ECU 19 having a dual or single suspended type is not executed, and thus a total time required for rollbacks can be shortened.

Example 2

In Example 2, it is assumed that there are a plurality (three) of target ECUs (ID1) to (ID3), but the override information 9 is not registered by an OEM in the ECU information DB 5, as with Example 1. Further, as in the case shown in FIG. 2B, it is assumed that the memory structures of the target ECU (ID1) and the ECU (ID2) are a dual type, while the memory structure of the ECU (ID3) is a single type. In the following, detailed description of parts overlapping with Example 1 will be omitted.

When the center computer 10 (the specification data generation unit 10*a*) receives an instruction for updating data, it reads the memory structure information 8 of each of the ECUs (ID1) to (ID3) from the ECU information DB5, and generates the specification data 50 corresponding to the ECUs (ID1) to (ID3) (Steps S10 to S30 in FIG. 14). At Step S40 of FIG. 14, it is determined that the target ECUs 19 are plural (Step S40: Yes), and the CGW 13 generates the specification data table 52 (Step S50). Here, the CGW 13 determines whether at least one of the target ECUs has a memory structure of a dual type (Step S60). Since the memory structures of the ECU (ID 2) and the ECU (ID 2) are the dual type, the CGW 13 generates the specification data table 52 so that the specification data 50 corresponding to the ECU (ID 1) and (ID 2) are arranged in front of the specification data 50 corresponding to the ECU (ID 3) in the specification data table 52 (Step S70; see FIG. 2B). Then, since the override information 9 is not set (Step S80: No), the CGW 13 terminates the specification data generation process.

The above-described specification data generation process is similarly executed when at least one of the target ECUs 19 includes a memory structure of the single suspended type. For example, when the memory structure of the ECU (ID3) is the single suspended type, the CGW 13 would generate the specification data table 52 such that the specification data 50 corresponding to the ECU (ID3) is behind of the specification data 50 corresponding to the ECU (ID1) and ECU (ID2) at Step S70. That is, in the generation process of the specification data table 52, the specification data 50 of the target ECU 19 having the single suspended type memory is treated in the same manner as the specification data 50 of the target ECU 19 having the single type memory. Therefore, the suspended memory type is excluded from the definition of "dual type" for the purpose of determination at Step S60.

In the packaged data generation process, the CGW 13 (the packaged data generation unit 10*b*) reads the updating data for each of the ECUs (ID1) to (ID3) from the EC reprogramming data DB and combines them as reprogramming data. Then, the reprogramming data is packaged together with the specification data table 52 to generate the packaged data 54 (Steps S100 and S110). The packaged data 54 is transmitted to the center-device communication unit 7 (Step S120), and the packaged data generation process is terminated.

Upon receiving the packaged data 54 from the center device 3, the vehicle device 4 executes the program rewrite control process. The CGW 13 (the program rewrite control unit 56) proceeds to Step S245 because there are a plurality of target ECUs 19 (Step S240: Yes). At Step S245, the CGW 13 (the rewrite order specification unit 56*b*) specifies the rewrite order of the target ECUs 19 from the order in which the specification data 50 corresponding to the ECUS (ID1) to (ID3) are arranged in the specification data table 52. Here, since the specification data 50 are arranged in the order of the ECU (ID1), the ECU (ID2), and the ECU (ID3), the ECUs 19 are rewritten in this order.

Next, the CGW 13 (the rewrite condition determining unit 56*d*) determines whether the memory structure of the target ECU (that is, the ECU 19 (ID 1)) whose specification data 50 is arranged first in the specification data table 52 is a single type (or a single suspended type) at Step S250. Since the memory structure of the ECU (ID1) is a dual type (Step S250: No), the CGW 13 (the rewrite execution unit 56*e*) performs a program rewrite with respect to the ECU (ID1) first at S270 regardless of whether the vehicle is parked or in operation. That is, the CGW 13 allows the program rewrite of the ECU (ID 1) having the dual type memory regardless of whether the vehicle is parked or in operation. Next, the CGW 13 (the program rewrite execution unit 56*e*) determines whether or not a program rewrite with respect to the last target ECU 19 (i.e., the ECU (ID3)) is completed (Step S280). Since a program rewrite of the last target ECU 19 (i.e., the ECU (ID 3)) is not completed (Step S280: No), the process returns to Step S250.

Next, the CGW 13 determines whether the memory structure of the target ECU (that is, the ECU 19 (ID2)) whose specification data 50 is arranged second in the specification data table 52 is a single type (or a single suspended type) at Step S250. Since the memory structure of the ECU (ID2) is also a dual type (Step S250: No), the CGW 13 performs a program rewrite with respect to the ECU (ID2) regardless of whether the vehicle is parked or in operation. Then, since a program rewrite of the ECU (ID3) is not completed (Step S280: No), the process returns to Step S250, and the CGW 13 determines whether the memory structure of the ECU (ID3) is a single or single suspended type.

Since the ECU (ID3) has a single type memory (Step S250: Yes), the CGW 13 determines whether the vehicle is parked (Step S260). Then, when the vehicle is determined to be parked (Step S260: Yes), the CGW 13 rewrites the application program of the ECU (ID3) (Step S270). Since the ECU (ID3) is the last target ECU 19, the CGW 13 terminates the program rewrite control process when the rewrite of the ECU (ID3) is completed (Step S280: Yes).

The processes of Steps S250 to S260 are similarly executed when the memory structure of the target ECU 19 is a single suspended type. That is, at Step S250, when the memory structure of the target ECU 19 is the single suspended type, the process proceeds to step S260. Then, the CGW 13 permits rewriting of the target ECU 19 only when the vehicle is parked (Step S260: Yes) at Step S270.

As described above, in the vehicle information communication system 1 according to the present embodiment, when there are a plurality of target ECUs 19, the center computer 10 generates the specification data table 52 in which the specification data 50 corresponding to each ECU 19 are included. Therefore, program rewrites for a plurality of target ECUs 19 can be controlled by a single specification data table 52. In addition, the center computer 10 can define the rewrite order in which the target ECUs 19 are rewritten by the arrangement order of the specification data 50 corresponding to the plurality of target ECUs 19 in the specification data table 52. Here, when there are a target ECU 19 with a dual type memory (i.e., a first target ECU) and a target ECU 19 with a single type memory, the center computer 10 generates the specification data table 52 such that the specification data 50 corresponding to the first target ECU 19 is arranged in front of the specification data 50 corresponding to the second target ECU 19 in the specification data table 52. As a result, the CGW 13 performs a program rewrite of the first target ECU 19 first. As described above, for the target ECU 19 having a dual type memory, a program rewrite can be performed with respect to the non-operation region of the memory regardless of whether the vehicle is parked or in operation. Therefore, the target ECU 19 having a dual type memory can be efficiently rewritten first, and thus the total time required to rewrite all the target ECUs 19 can be shortened.

Next, under the condition of Example 2, a case where a user cancels the update (program rewrite) while rewriting the application program of the last target ECU 19 (i.e., the ECU (ID3) in FIG. 2B) will be described. In this case, the CGW 13 (the rollback control unit 75) executes the rollback control process as shown in FIGS. 17A and 17B. Since the ECU (ID3) has a single type memory, the rollback flow for the ECU (ID3) is the same as the flow of FIG. 17A described in Example 1 (see Steps S420 to S450). When the rollback to the ECU (ID3) is completed (Step S450: Yes), the CGW 13 (the rollback order specifying unit 75b) determines whether there are a plurality of target ECUs 19 (Step S460). In Example 2, there are a plurality of target ECUs 19 (Step S460: Yes), the process proceeds to the flow as shown in FIG. 17B.

At Step S500, the CGW 13 (the rollback order specifying unit 75b) determines whether there is a rewrite completed ECU 19. Here, since program rewrites to the ECU (ID1) and ECU (ID2) have already been completed when receiving a cancellation instruction (Step S500: Yes), the CGW 13 (the rollback order specifying unit 75b) specifies the rollback order (Step S510). That is, the CGW 13 specifies the order in which the specification data 50 corresponding to the rewrite completed ECUs 19 are arranged in the specification data table 52 transmitted from the center device 3. In Example 2, since the specification data 50 are arranged in the order of the ECU (ID1) and the ECU (ID2) (See FIG. 2B), the CGW 13 determines to perform rollbacks in this order.

Next, the CGW 13 (the memory structure specifying unit 75c) analyzes the specification data 50, and specifies the memory structure of the first rewrite completed ECU 19 (that is, the ECU (ID1)) at Step S520. In Example 1, since the memory structure of the ECU (ID1) is the dual type, the CGW 13 specifies the memory structure of the first rewrite completed ECU 19 as a dual type. Next, the CGW 13 (the rollback execution unit 75d) determines whether the specified memory structure is a single type (Step S530). Since the memory structure of the ECU (ID1) is the dual type (Step S530: No), the process proceeds to step S540. That is, if the ECU 19 whose program write to a new version has already completed has a dual type memory, the process on the ECU 19 ends without rolling back the non-operation region of the memory to the old version.

At Step S560, the CGW 13 (the rollback execution unit 75d) determines whether or not the roll back with respect to the last rewrite completed ECU 19 has been completed. Since the rollback with respect to the ECU (ID2) is not yet performed, the process returns to Step S520 (Step S560: No). The CGW 13 (the memory structure specifying unit 75c) specifies the memory structure of the next rewrite completed ECU 19. Since the ECU (ID 2) has a memory structure of the dual type, the CGW 13 specifies that the memory structure of the next rewrite completed ECU 19 is a dual type. Therefore, as with the ECU (ID1), the process proceeds to Step S560 without performing a rollback to the old version with respect to the non-operation region of the memory 28d. Then, since the ECU (ID2) is the last rewrite completed ECU 19 (Step S560: Yes), the CGW 13 terminates the rollback control process.

As described above, when there are a plurality of rewrite completed targets ECUs 19 at the time of receiving a cancellation instruction, rollbacks of the rewrite completed ECUs 19 are performed in the order in which the specification data 50 corresponding to the rewrite completed ECUs 19 are arranged in the specification data table 52. Therefore, the center device 30 can appropriately determine the order of rollbacks with respect to the ECUs 19 by setting the arrangement order of the specification data 50 corresponding to the ECUs 19 in the specification data table 52.

It should be noted that, at Step S500, when there is no rewrite completed ECU 19 at the time of receiving the cancellation instruction, the flow shown in FIG. 17B ends. In addition, at Step S530, when the memory structure of the rewrite completed ECU 19 is a single type, the rollback difference data is transmitted to the rewrite completed ECU 19 (Step S540). Then, a rollback of the application program from the new version to the old version is performed using the rollback difference data. When the rollback of the target ECU 19 is completed (Step S550: Yes), the process proceeds to Step S560.

In the above described Example 2, the cancellation instruction arises during the rewriting of the last target ECU 19 (i.e., the ECU (ID3)) after the rewritings of the first two ECUs 19 have already been completed. For example, if there are four target ECUs 19 and a cancellation instruction arises while the third target ECU 19 is being rewritten, rollbacks on the third target ECU 19 are performed first, rollbacks of the first two rewrite completed target ECUs 19 are performed, and then the rollback control process ends. That is, any process is not performed on the fourth target ECU 19 whose program rewrite has not yet been initiated at the time of receiving the cancellation instruction.

Example 3

Next, in Example 3, it is assumed that the override information 9 that restricts program rewrites of all the ECUs 19 mounted on particular types of vehicles to when the vehicles are parked. Other than this, Example 3 is similar to Example 2. Therefore, in the following, detailed descriptions of portions overlapping with Examples 1 and 2 will be omitted.

In the specification data generation process, since the override information 9 is set at Step S80 of FIG. 14 (Yes), the center computer 10 includes the override information in the specification data 50 (in this example, the specification data table 52) (see FIG. 2C). Then, in the packaged data generation process, the specification data table 52 including the override information 9 is packaged together with the updating data for each target ECUs 19 to generate the packaged data 54 (Steps S100 to S120 in FIG. 15).

In the program rewrite control process, the CGW 13 (the override information specifying unit 56a) analyzes the specification data 50 to determine whether the override information 9 exists in the specification data table 52 (Step S200 in FIG. 16). If an affirmative determination is made in Step S200, the CGW 13 determines whether the override information 9 restricts program rewrites to when the vehicle is parked (Step S210). When an affirmative determination is made at Step S210, the CGW 13 (the execution condition determining unit 56d) determines whether the vehicle is parked (Step S220). Then, when the vehicle is determined to be parked (Step S220: Yes), the CGW 13 (the program rewrite execution unit 56e) rewrites the application program of all the target ECUs (Step S230). That is, when the override information 9 is set, program rewrites of these target ECUs 19 are permitted only while the vehicle is parked, even if the target ECUs 19 are the ECU (ID1) and ECU (ID2) having a dual type memory.

As described above, in the vehicle information communication system 1 according to the present embodiment, when the override information 9 restricting program rewrites for the vehicle is set, the center computer 10 includes the override information 9 in the specific data 50. Thereby, the CGW 13 performs program rewrites of all the ECUs 19 only when the vehicle is parked regardless of the memory structures of the ECUs 19. Therefore, the rewrite timing of all the ECUs 19 mounted on particular types of vehicles can be freely controlled by OEMs. In addition, even if the memory structure of at least one target ECUs 19 is dual type, the rewrite timing can be forcibly restricted to when the vehicle is parked by setting the override information 9. Thus, the intention of OEMs can be properly reflected by setting the override information 9.

(Modifications)

Next, vehicle information communication systems according to modifications to the above-described embodiment will be described. In the following description, detailed descriptions of parts overlapping with the embodiment will be omitted.

(Modification 1)

Figure 18:
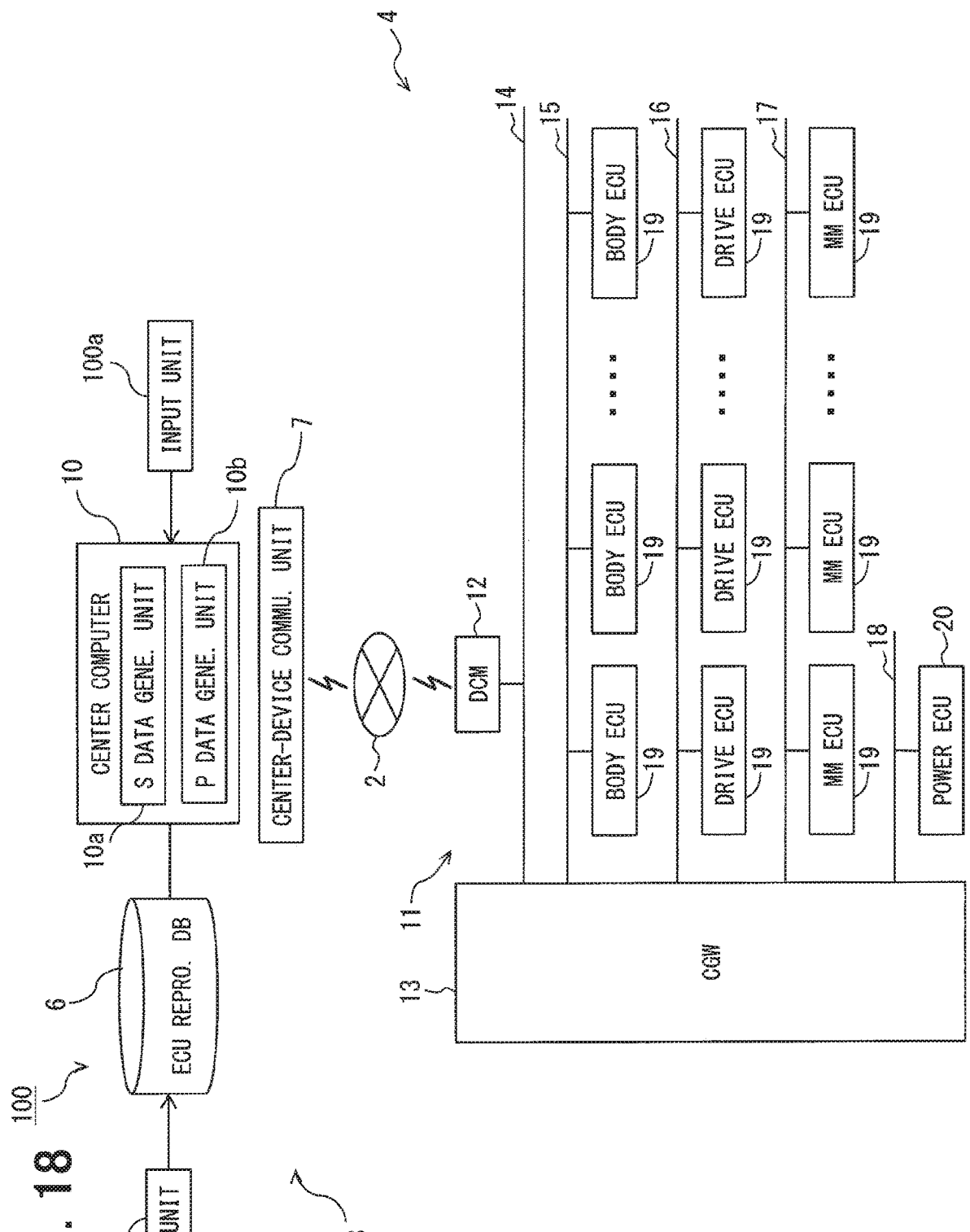
FIG. 18 is a diagram showing an overall configuration of a vehicle information communication system according to a first modification.
Figure 19:
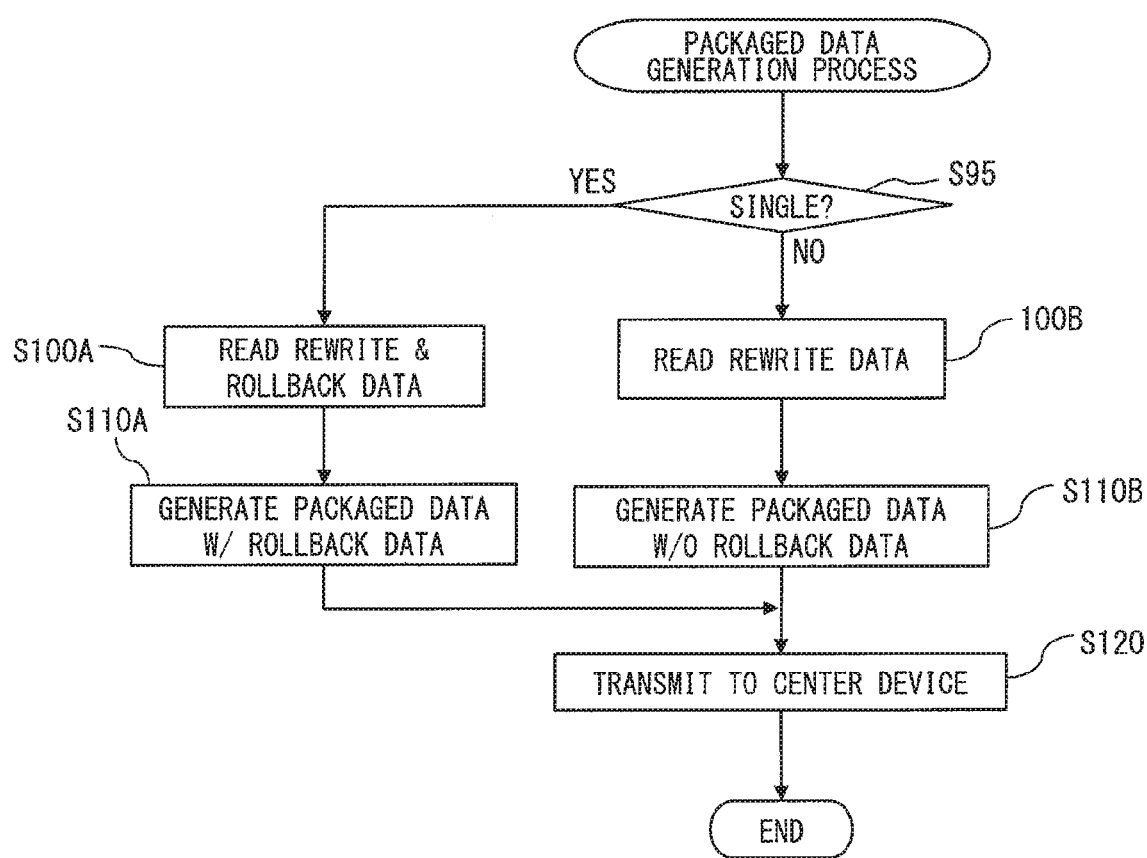
FIG. 19 is a flowchart showing packaged data generation process according to a second modification.

As shown in FIG. 18, a vehicle information communication system 100 according to the first modification does not have the ECU information DB 5 described in the above embodiment. That is, in the first modification, the memory structure information 8 and the override information 9 are not registered and stored in the ECU information DB 5, but are directly input by OEMs or the like to the center computer 10 when updating of ECUs 19 are required.

Here, the input to the center computer 10 is performed via a particular input unit (for example, a personal computer) 100a. For example, the memory structure information 8 and the override information 9 for target ECUs 19 may be entered in an Excel (registered trademark) sheet, and such an Excel sheet may be imported into a particular personal computer. When the memory structure information 8 and the override information 9 are input to the center computer 10, the center computer 10 generates the specification data 50 (the specification data table 52) including the information. Then, the center computer 10 packages the specification data 50 together with the updating data to generate the packaged data 54 and wirelessly transmits the packaged data 54 to the vehicle device 4 as in the above-described embodiment. The vehicle device 4 that received the packaged data 54 controls updating (i.e., rewriting and rolling back) of target ECUs 19 based on the specification data 50 as in the embodiment.

As described above, in the first modification, the center computer 10 generates the specification data 50 including the memory structure information 8 and the override information 9. Therefore, the specification data 50 in view of the memory structure of the target ECU 19 can be generated without using the ECU information DB5. Further, the specification data 50 including the override information 9 reflecting the intention of OEMs can be generated.

(Modification 2)

In the vehicle information communication system 1 according to the above-described embodiment, when the center computer 10 (the packaged data generation unit 10b) generates the packaged data 54, the rollback difference data is always included in the packaged data 54. On the contrary, in the vehicle information communication system according to the second modification, the center computer 10 (the packaged data generation unit 10b) includes the rollback difference data in the packaged data 54 only when the memory structure of the target ECU 19 is a single type. That is, when the memory structure of the target ECU 19 is a dual or single suspended type, the center computer 10 is configured not to include the rollback difference data in the packaged data 54.

IG. 19 is a flowchart showing a packaged data generation process performed by the center computer 10 (the packaged data generating unit 10b) in the vehicle information communication system according to the second modification. When receiving an update instruction, the center computer 10 determines whether the memory structure of the target ECU 19 is a single type (Step S95). If the memory structure of the target ECU 19 is a single type (Step S95: Yes), the rewrite difference data and the rollback difference data for the target ECU 19 are read from the ECU reprogramming data DB 6 (Step S100A). Then, the center computer 10 generates the packaged data 54 including the rollback difference data (Step S110A). Then, the center computer 10 transmits the generated packaged data 54 to the center-device communication unit 7 (Step S120), and thereafter the package generation process ends.

On the contrary, when the memory structure of the target ECU 19 is a dual or single suspended type (Step S95: No), the center computer 10 reads only the rewrite difference data for the target ECU 19 from the ECU reprogramming data DB 6 (Step S100B). Then, the center computer 10 generates the packaged data 54 without the rollback difference data (Step S110B). The center computer 10 transmits the generated packaged data 54 to the center-device communication unit 7 (Step S120), and thereafter the package generation process ends.

As described above, in the vehicle information communication system according to the second modification, the rollback difference data is included in the packaged data 54 only when the memory structure of the target ECU 19 is a single type. Here, as described in the above embodiment, the target ECU 19 having a dual or single suspended type memory is not subjected to the rollback using the rollback difference data (see Step S420). Therefore, the rollback difference data is not used for the ECU 19 having a dual or single suspended type memory. Therefore, in the vehicle information communication system according to the second modification, the total data amount to be wirelessly transmitted between the center device 3 and the vehicle device 4 can be reduced by including the rollback difference data in the packaged data 54 only when the memory structure of the target ECU 19 is a single type.

In the embodiment described above, when the timing of rewriting of the target ECU 19 is not restricted, the override information 9 is not included in the specification data 50 as shown in FIGS. 2A and 2B. However, the override information 9 may be always included in the specification data 50. Specifically, when the rewrite timing of the target ECUs 19 is not restricted, such information indicating "no restriction" may be included in the specification data 50 as the override information 9.

The functions executed by the center device 3 described above may be realized by hardware or software. Also, it may be realized by cooperation of hardware and software. The data to be rewritten may be not only the application program but also data such as a map or data such as a control parameter. Further, the contents of the specification data 50 are not limited to those described above.

The following is summary of another aspects of technical features described in the above embodiment and the modifications 1 and 2.

(First Aspect)

A first aspect is directed to a method of performing program data rewrites for a plurality of electronic control units (ECUs) 19 of a vehicle device 4 mounted in a vehicle. Each of the plurality of ECUs 19 includes a memory 28d configured to store program data. The method includes: storing memory structure information 8 for each of the plurality of ECUs 19 in a storage unit 5, the memory structure information 8 indicating whether a corresponding memory 28d has a memory structure that supports Read While Write (RWW) operation defined as having a plurality of physically independent memory regions; reading from the storage unit 5 the memory structure information 8 of at least one target ECU 19 among the plurality of ECUs 19, the at least one target ECU 19 being targets for a program data rewrite; generating specification data 50 including the memory structure information 8 for each of the at least one target ECUs 19, the specification data 50 being for use by the vehicle device 4 when controlling the program data rewrites; communicating the specification data 50 to the vehicle device 4; and performing the program data rewrites of the at least one target ECU 19 according to the memory structure information 8 included in the specification data 50.

(Second Aspect)

A second aspect is directed to the method according to the first aspect, further comprising: determining whether the vehicle is parked or in operation, when the memory structure information 8 indicates that the memory 28d of the at least one target ECU 19 supports RRW operation, rewriting new program data into one of the plurality of independent memory regions of the memory 28d regardless of whether the vehicle is parked or in operation, and when the memory structure information 8 indicates that the memory 28d of the at least one target ECU 19 does not support RWW operation, restricting the rewriting of the program data for the at least one target ECU 19 to when the vehicle is determined to be parked.

(Third Aspect)

A third aspect is directed to the method according to the second aspect, further comprising: storing override information 9 in the storage unit 5; reading the override information 9 from the storage unit 5 and including the override information 9 in the specification data 50 when the override information 9 is set for the at least one target ECU 19; and when the override information 9 is included in the specification data 50, restricting the rewriting of the program data for all ECUs 19 of the at least one target ECU 19 to when the vehicle is determined to be parked, regardless of whether any one of the at least one target ECU 19 supports RWW operation.

(Fourth Aspect)

A fourth aspect is directed to the method according to the first aspect, further comprising: when receiving an instruction to cancel the program data rewrites, performing a rollback of the program data rewrites of the at least one target ECU 19 based on the memory structure information 8 in the specification data 50.

(Fifth Aspect)

A fifth aspect is directed to the method according to the forth aspect, further comprising: when the at least one target ECU 19 includes a plurality of target ECUs 19, generating a specification data table 52 that includes the specification data 50 corresponding to each of the plurality of target ECUs, the specification data table 52 being a series of bits in which bits corresponding to each of the specification data 50 are arranged in a rewrite order that indicates an order for performing the program data rewrites of the plurality of target ECUs 19; communicating the specification data table 52 to the vehicle device 4; rewriting the program data of each of the plurality of target ECUs 19 one by one in the rewrite order; upon receiving an instruction to cancel the program data rewrites when the program data rewrites of the plurality of target ECUs 19 are currently partially completed, performing a rollback of the program data rewrite for the target ECU 19 whose program data rewrite is currently being performed; and after rolling back the current program data rewrite, performing a rollback of the program data rewrites for the target ECUs 19 whose program data rewrites have been already completed, wherein the rollback of the program data rewrites are performed in the same order as the rewrite order.

(Sixth Aspect)

A sixth aspect is directed to the method according to the first aspect, further comprising: when the at least one target ECU 19 includes a plurality of target ECUs 19, generating a specification data table 52 that includes the specification data 50 corresponding to each of the plurality of target ECUs 19, the specification data table 52 being a series of bits in which bits corresponding to each of the specification data 50 are arranged in a rewrite order that indicates an order for performing the program data rewrites of the plurality of target ECUs 19; communicating the specification data table 52 to the vehicle device 4; and rewriting the program data of each of the plurality of target ECUs 19 one by one in the rewrite order in the specification data table.

(Seventh Aspect)

A seventh aspect is directed to the method according to the sixth aspect, further comprising: when the plurality of target ECUs 19 include at least one first target ECU 19 which supports RWW operation and at least one second target ECU 19 which does not support RWW operation, generating the specification data table 52 such that the bits corresponding to the specification data 50 of the at least one first target ECU 19 are arranged in front of the bits corresponding to the specification data 50 of the at least one second target ECU 19.

(Eighth Aspect)

A eighth aspect is directed to a center device 3 that generates specification data 50 for use by a vehicle device 4 mounted in a vehicle when controlling program data rewrites for a plurality of electronic control units (ECUs) 19 of the vehicle, each of the plurality of ECUs 19 including a memory 28d configured to store program data, the center device 3 comprising: a storage unit 5 that stores memory structure information 8 for each of the ECUs 19, the memory structure information 8 indicating whether a corresponding memory 28d has a memory structure that supports Read While Write (RWW) operation defined as having a plurality of physically independent memory regions; a center computer 10 programmed to: (i) read from the storage unit 5 the memory structure information 8 of at least one target ECU 19 among the plurality of ECUs 19, the at least one target ECU 19 being targets for a program data rewrite, and (ii) generate specification data 50 including the memory structure information 8 for each of the at least one target ECUs 19; and a center-device communication unit 7 configured to wirelessly communicate the specification data 50 generated by the center computer 10 to the vehicle device 4, wherein the program data rewrites of the at least one target ECU 19 are performed by the vehicle device 4 according to the memory structure information 8 included in the specification data 50.

(Ninth Aspect)

A ninth aspect is directed to the center device 3 according to the eighth aspect, wherein the vehicle is determined to be parked or in operation, when the memory structure information 8 indicates that the memory 28*d* of the at least one target ECU 19 supports RRW operation, new program data is rewritten into one of the plurality of independent memory regions of the memory 28*d* regardless of whether the vehicle is parked or in operation, and when the memory structure information 8 indicates that the memory of the at least one target ECU 19 does not support RWW operation, the rewriting of the program data for the at least one target ECU 19 is restricted to when the vehicle is determined to be parked.

(Tenth Aspect)

A tenth aspect is directed to the center device 3 according to the ninth aspect, wherein the storage unit 5 further stores override information 9, the center computer 10 is further programmed to read the override information 9 from the storage unit 5 and include the override information 9 in the specification data 50 when the override information is set for the at least one target ECU 19, and when the override information 9 is included in the specification data 50, the rewriting of the program data for all ECUs 19 of the at least one target ECU 19 is restricted to when the vehicle is determined to be parked, regardless of whether any one of the at least one target ECU 19 supports RWW operation.

(Eleventh Aspect)

An eleventh aspect is directed to the center device 3 according to the eighth aspect, wherein when receiving an instruction to cancel the program data rewrites, a rollback of the program data rewrites of the at least one target ECU 19 is performed based on the memory structure information 8 in the specification data 50.

(Twelfth Aspect)

A twelfth aspect is directed to the center device 3 according to the eleventh aspect, wherein the at least one target ECU 19 includes a plurality of target ECUs 19, the center computer 10 is further programmed to generate a specification data table 52 that includes the specification data 50 corresponding to each of the plurality of target ECUs 19, the specification data table 52 being a series of bits in which bits corresponding to each of the specification data 50 are arranged in a rewrite order that indicates an order for performing the program data rewrites of the plurality of target ECUs 19, the center-device communication unit 7 is further configured to communicate the specification data table 52 generated by the center computer 10 to the vehicle device 4, the program data of each of the plurality of target ECUs 19 is written one by one in the rewrite order, and upon receiving an instruction to cancel the program data rewrites when the program data rewrites of the plurality of target ECUs 19 are currently partially completed, a rollback of the program data rewrite for the target ECU 19 whose program data rewrite is currently being performed is performed, and after rolling back the current program data rewrite, a rollback of the program data rewrites for the target ECUs 19 whose program data rewrites have been already completed is performed, wherein the rollback of the program data rewrites are performed in the same order as the rewrite order.

(Thirteenth Aspect)

A thirteenth aspect is directed to the center device 3 according to the eighth aspect, wherein the at least one target ECU 19 includes a plurality of target ECUs 19, the center computer 10 is further programmed to generate a specification data table 52 that includes the specification data 50 corresponding to each of the plurality of target ECUs 19, the specification data table 52 being a series of bits in which bits corresponding to each of the specification data 50 are arranged in a rewrite order that indicates an order for performing the program data rewrites of the plurality of target ECUs 19, the center-device communication unit 7 is further configured to communicate the specification data table 52 generated by the center computer 10 to the vehicle device 4, and the program data of each of the plurality of target ECUs 19 is rewritten one by one in the rewrite order in the specification data table 52 communicated by the center-device communication unit 7.

(Fourteenth Aspect)

A fourteenth aspect is directed to the center device 3 according to the thirteenth aspect, wherein the plurality of target ECUs 19 include at least one first target ECU 19 which supports RWW operation and at least one second target ECU 19 which does not support RWW operation, and the center computer 10 is further programmed to generate the specification data table 52 such that the bits corresponding to the specification data 50 of the at least one first target ECU 19 are arranged in front of the bits corresponding to the specification data 50 of the at least one second target ECU 19.

(Fifteenth Aspect)

A fifteenth aspect is directed to a vehicle information communication system 100, comprising: a vehicle device 4, mounted in a vehicle, that controls programs data rewrites for a plurality of electronic control units (ECU) 19 of the vehicle, each of the ECUs 19 including a memory 28*d* configured to store program data; and a center device 3 that generates specification data 50 for use by the vehicle device 4 when controlling the program data rewrites, wherein the center device 3 includes: a center computer 10 programmed to generate specification data 50 for at least one target ECU 19 among the plurality of ECUs 19, the at least one target ECU 19 being targets for a program data rewrite; and a center-device communication unit 7 configured to wirelessly communicate the specification data 50 generated by the center computer 10 to the vehicle device 4, wherein the center computer 10 is programmed to include in the specification data 50 memory structure information 8 for the at least one target ECU 19, the memory structure information 8 indicating whether a corresponding memory 28*d* has a memory structure that supports Read While Write (RWW) operation defined as having a plurality of physically independent memory regions, the vehicle device 4 includes: a vehicle-device communication unit 12 configured to receive the specification data 50 from the center-device communication unit 7; and a vehicle computer 13 programmed to perform the program data rewrites of the at least one target ECU 19 according to the memory structure information 8 included in the specification data 50.

(Sixteenth Aspect)

A sixteenth aspect is directed to the vehicle communication system 100 according to the fifteenth aspect, wherein the vehicle computer 13 is further programmed to: (i) determine whether the vehicle is parked or in operation, (ii) when the memory structure information 8 indicates that the memory 28*d* of the at least one target ECU 19 supports RRW operation, rewrite new program data into one of the plurality of independent memory regions of the memory 28*d* regardless of whether the vehicle is parked or in operation, and (iii) when the memory structure information 8 indicates that the memory 28*d* of the at least one target ECU does not support RWW operation, restrict the rewriting of the program data for the at least one target ECU to when the vehicle is determined to be parked.

(Seventeenth Aspect)

A seventeenth aspect is directed to the vehicle communication system 100 according to the sixteenth aspect, wherein the center computer 10 is further programmed to include override information 9 when the override information 9 is set for the at least one target ECU 19, and the vehicle computer 13 is further programmed to, when the override information 9 is included in the specification data 50, restrict the rewriting of the program data for all ECUs 19 of the at least one target ECU 19 to when the vehicle is determined to be parked, regardless of whether any one of the at least one target ECU 19 supports RWW operation.

(Eighteenth Aspect)

A eighteenth aspect is directed to the vehicle information communication system 100 according to the fifteenth aspect, wherein the vehicle computer 13 is further programmed to, when receiving an instruction to cancel the program data rewrites, perform a rollback of the program data rewrites of the at least one target ECU 19 based on the memory structure information 8 in the specification data 50.

(Nineteenth Aspect)

A nineteenth aspect is directed to the center device 3 according to the eleventh aspect, wherein the at least one target ECU 19 includes a plurality of target ECUs 19, the center computer 10 is further programmed to generate a specification data table 52 that includes the specification data 50 corresponding to each of the plurality of target ECUs 19, the specification data table 52 being a series of bits in which bits corresponding to each of the specification data 50 are arranged in a rewrite order that indicates an order for performing the program data rewrites of the plurality of target ECUs 19, the center-device communication unit 7 is further configured to communicate the specification data table 52 generated by the center computer 10 to the vehicle-device communication unit 12, the vehicle computer 13 is further programmed to: rewrite the program data of each of the plurality of target ECUs 19 one by one in the rewrite order, upon receiving an instruction to cancel the program data rewrites when the program data rewrites of the plurality of target ECUs 19 are currently partially completed: perform a rollback of the program data rewrite for the target ECU 19 whose program data rewrite is currently being performed, and after rolling back the current program data rewrite, perform a rollback of the program data rewrites for the target ECUs 19 whose program data rewrites have been already completed, wherein the rollback of the program data rewrites are performed in the same order as the rewrite order.

(Twentieth Aspect)

A twentieth aspect is directed to the center device 3 according to the eighth aspect, wherein the at least one target ECU 19 includes a plurality of target ECUs 19, the center computer 10 is further programmed to generate a specification data table 52 that includes the specification data 50 corresponding to each of the plurality of target ECUs 19, the specification data table 52 being a series of bits in which bits corresponding to each of the specification data 50 are arranged in a rewrite order that indicates an order for performing the program data rewrites of the plurality of target ECUs 19, the center-device communication unit 7 is further configured to communicate the specification data table 52 generated by the center computer 10 to the vehicle device 4, the vehicle computer 13 is further programmed to rewrite the program data of each of the plurality of target ECUs 19 one by one in the rewrite order in the specification data table 52 communicated by the center-device communication unit 7.

(Twenty First Aspect)

A twenty first aspect is directed to the vehicle information communication system 100 according to the twentieth aspect, wherein the plurality of target ECUs 19 include at least one first target ECU 19 which supports RWW operation and at least one second target ECU 19 which does not support RWW operation, and the center computer 10 is further programmed to generate the specification data table 52 such that the bits corresponding to the specification data 50 of the at least one first target ECU 19 are arranged in front of the bits corresponding to the specification data 50 of the at least one second target ECU 19.

The invention claimed is:

1. A vehicle information communication system, comprising:
   a vehicle device, mounted in a vehicle, that controls programs data rewrites for a plurality of electronic control units (ECUs) of the vehicle, each of the ECUs including a memory configured to store program data; and
   a center device that generates specification data for use by the vehicle device when controlling the program data rewrites, wherein
   the center device includes:
      a storage unit that stores ECU-related information for each of the ECUs, the ECU-related information being information associated with each of the ECUs;
      a center computer programed to
         (i) read from the storage unit the ECU-related information of at least one target ECU among the plurality of ECUs, the at least one target ECU being targets for a program data rewrite, and
         (ii) generate specification data including the ECU-related information for each of the at least one target ECUs; and
      a center-device communication unit configured to wirelessly communicate the specification data generated by the center computer to the vehicle device, and
   the vehicle device includes:
      a vehicle-device communication unit configured to receive the specification data from the center-device communication unit; and
      a vehicle computer programmed to perform the program data rewrites of the at least one target ECU according to the ECU-related information included in the specification data, wherein
   the at least one target ECU includes a plurality of target ECUs,
   the center computer is further programmed to generate a specification data table that includes the specification data corresponding to each of the plurality of target ECUs, the specification data table being a series of bits in which bits corresponding to each of the specification data are arranged in a rewrite order that indicates an order for performing the program data rewrites of the plurality of target ECUs,
   the center-device communication unit is further configured to communicate the specification data table generated by the center computer to the vehicle-device communication unit, and
   the vehicle computer is further programmed to rewrite the program data of each of the plurality of target ECUs one by one in the rewrite order in the specification data table received by the vehicle-device communication unit.

2. The vehicle information communication system according to claim 1, wherein the ECU-related information includes override information, the center computer is further programmed to read the override information from the storage unit and include the override information in the specification data when the override information is set for the at least one target ECU, and the vehicle computer is further programmed to, when the override information is included in the specification data, restrict the rewriting of the program data for all ECUs of the at least one target ECU to when the vehicle is determined to be parked.

3. The vehicle information communication system according to claim 1, wherein the vehicle computer is further programmed to, when receiving an instruction to cancel the program data rewrites, perform a rollback of the program data rewrites of the at least one target ECU based on the ECU-related information in the specification data, wherein the vehicle computer is further programmed to:
upon receiving an instruction to cancel the program data rewrites when the program data rewrites of the plurality of target ECUs are currently partially completed, perform a rollback of the program data rewrite for the target ECU whose program data rewrite is currently being performed; and after rolling back the current program data rewrite, perform a rollback of the program data rewrites for the target ECUs whose program data rewrites have been already completed, wherein the rollback of the program data rewrites are performed in the same order as the rewrite order.

4. A vehicle information communication system, comprising:

a vehicle device, mounted in a vehicle, that controls programs data rewrites for a plurality of electronic control units (ECUs) of the vehicle, each of the ECUs including a memory configured to store program data; and a center device that transmits specification data for use by the vehicle device when controlling the program data rewrites, wherein the center device includes
a center-device communication unit configured to wirelessly communicate to the vehicle device the specification data including ECU-related information of at least one target ECU among the plurality of ECUs that is a target for a program data rewrite, wherein the ECU-related information is information associated with the at least one target ECU, and the vehicle device includes:
a vehicle-device communication unit configured to receive the specification data from the center-device communication unit; and a vehicle computer programmed to perform the program data rewrites of the at least one target ECU according to the ECU-related information included in the specification data, wherein the at least one target ECU includes a plurality of target ECUs, the center-device communication unit is further configured to communicate to the vehicle device a specification data table that includes the specification data corresponding to each of the plurality of target ECUs, the specification data table being a series of bits in which bits corresponding to each of the specification data are arranged in a rewrite order that indicates an order for performing the program data rewrites of the plurality of target ECUs, and the vehicle computer is further programmed to rewrite the program data of each of the plurality of target ECUs one by one in the rewrite order in the specification data table received by the vehicle-device communication unit.

5. The vehicle information communication system according to claim 4, wherein the ECU-related information includes override information when the override information is set for the at least one target ECU, and the vehicle computer is further programmed to, when the override information is included in the specification data, restrict the rewriting of the program data for all ECUs of the at least one target ECU to when the vehicle is determined to be parked.

6. The vehicle information communication system according to claim 4, wherein the vehicle computer is further programmed to, when receiving an instruction to cancel the program data rewrites, perform a rollback of the program data rewrites of the at least one target ECU based on the ECU-related information in the specification data, wherein the vehicle computer is further programmed to:
upon receiving an instruction to cancel the program data rewrites when the program data rewrites of the plurality of target ECUs are currently partially completed, perform a rollback of the program data rewrite for the target ECU whose program data rewrite is currently being performed; and after rolling back the current program data rewrite, perform a rollback of the program data rewrites for the target ECUs whose program data rewrites have been already completed, wherein the rollback of the program data rewrites are performed in the same order as the rewrite order.

* * * * *